United States Patent
Hattori et al.

(10) Patent No.: US 7,608,310 B2
(45) Date of Patent: Oct. 27, 2009

(54) LIQUID CRYSTAL COMPOSITION AND LIQUID CRYSTAL DISPLAY DEVICE

(75) Inventors: Norikatsu Hattori, Ichihara (JP); Hitoshi Yamamoto, Chino (JP); Hiroaki Fujita, Ichihara (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 386 days.

(21) Appl. No.: 11/472,564

(22) Filed: Jun. 22, 2006

(65) Prior Publication Data

US 2007/0007493 A1   Jan. 11, 2007

(30) Foreign Application Priority Data

Jun. 22, 2005   (JP)   ............... 2005-181929

(51) Int. Cl.
*C09K 19/30* (2006.01)
*C09K 19/12* (2006.01)

(52) U.S. Cl. ............... 428/1.1; 252/299.63; 252/299.66

(58) Field of Classification Search .................. 428/1.1; 252/299.63, 299.66

See application file for complete search history.

(56) References Cited

U.S. PATENT DOCUMENTS

| | | | |
|---|---|---|---|
| 4,415,470 A | | 11/1983 | Eidenschink et al. |
| 4,545,922 A | | 10/1985 | Eidenschink et al. |
| 5,965,060 A | | 10/1999 | Tarumi et al. |
| 6,217,953 B1 | * | 4/2001 | Heckmeier et al. ............ 428/1.1 |
| 7,291,368 B2 | * | 11/2007 | Yamamoto et al. ............ 428/1.1 |
| 2001/0010366 A1 | | 8/2001 | Heckmeier et al. |
| 2003/0017279 A1 | | 1/2003 | Klasen-Memmer et al. |
| 2005/0224758 A1 | * | 10/2005 | Yamamoto et al. ..... 252/299.63 |
| 2005/0230661 A1 | * | 10/2005 | Hattori et al. ........... 252/299.63 |

FOREIGN PATENT DOCUMENTS

| | | |
|---|---|---|
| DE | 38 07 872 A1 | 9/1989 |
| DE | 44 26 799 A1 | 2/1995 |
| DE | 196 07 043 A1 | 8/1997 |
| EP | 0 364 538 B1 | 5/1992 |
| JP | 57-114532 A | 7/1982 |
| JP | 7-53432 A | 2/1995 |
| JP | 2811342 B2 | 8/1998 |
| WO | WO 02/099010 A1 | 12/2002 |

OTHER PUBLICATIONS

English translation for DE-19607043 provided by EPO.*
European Search Report dated Sep. 25, 2006 for European Application No. 06 25 3166.

* cited by examiner

*Primary Examiner*—Shean C Wu
(74) *Attorney, Agent, or Firm*—Hogan & Hartson LLP

(57) ABSTRACT

The invention provides a liquid crystal composition that satisfies many characteristics among the characteristics such as a wide temperature range of a nematic phase, a small viscosity, a suitable optical anisotropy, a negatively large dielectric anisotropy, and a large specific resistance, and a liquid crystal display device containing the composition. The liquid crystal composition has a negative dielectric anisotropy and contains a first component containing a mono-fluorine-replaced liquid crystal compound having a specific structure and a second component containing a liquid crystal compound having two or more fluorines having a specific structure, and the liquid crystal display device contains the liquid crystal composition.

23 Claims, No Drawings

LIQUID CRYSTAL COMPOSITION AND LIQUID CRYSTAL DISPLAY DEVICE

CROSS REFERENCE TO RELATED APPLICATION

This application claims priority under 35 U.S.C. § 119 to Japanese Patent Application No. JP 2005-181929, filed Jun. 22, 2005, which application is expressly incorporated herein by reference in its entirety.

BACKGROUND OF THE INVENTION

1. Field of the Invention

The invention relates to a liquid crystal composition and a liquid crystal display device containing the composition.

2. Related Art

A liquid crystal display device (which is a generic term that includes a liquid crystal display device, a liquid crystal display panel and a liquid crystal display module) utilizes optical anisotropy, dielectric anisotropy and so forth of a liquid crystal composition, and as an operating mode of the liquid crystal display device, such various modes have been known as a phase change (PC) mode, a twisted nematic (TN) mode, a super twisted nematic (STN) mode, a bistable twisted nematic (BTN) mode, an electrically controlled birefringence (ECB) mode, an optically compensated bend (OCB) mode, an in-plane switching (IPS) mode, a vertical alignment (VA) mode, and so forth. Among these display modes, it has been known that an ECB mode, an IPS mode, a VA mode and so forth are capable of being improved in viewing angle while the conventional modes, such as a TN mode, an STN mode and so forth, have a problem therein. A liquid crystal composition having a negative dielectric anisotropy can be used in a liquid crystal display device of these modes. A liquid crystal compound having 2,3-difluorophenylene contained in the liquid crystal composition having a negative dielectric anisotropy is being studied (as described, for example, in Japanese Patent No. 2811342 and No. 1761492). A liquid crystal composition having a negative dielectric anisotropy capable of being used in the liquid crystal display device has also been studied (as described, for example, in DE 19 607 043, JP 2004-532344 (International Publication No. 02/99010), and JP H10-176167 A/1998).

A fluorine-replaced liquid crystal compound and a liquid crystal composition containing the compound are disclosed in JP H07-053432 A/1995. However, the technique disclosed in JP H07-053432 A/1995 considers only a liquid crystal compound having a positive dielectric anisotropy but fails to study a liquid crystal compound having a negative dielectric anisotropy. A liquid crystal composition having a combination of a liquid crystal compound having 2,3-difluorophenylene and a non-fluorine-replaced liquid crystal compound is disclosed in DE 19 607 043, JP 2004-532344 (International Publication No. 02/99010), and JP H10-176167 A/1998. However, the compound contains a non-fluorine-replaced liquid crystal compound not having a negative dielectric anisotropy, and there are some cases where the compound does not have a negatively large dielectric anisotropy. A liquid crystal composition having a combination including a mono-fluorine-replaced, which analogous to the first component of the invention, is disclosed in DE 19 607 043 and JP H10-176167A/1998. However, the compounds disclosed in the examples thereof have a negatively small dielectric anisotropy, and the minimum temperature of a nematic phase has not been clarified.

The liquid crystal compound is a generic term for a compound having a liquid crystal phase such as a nematic phase, a smectic phase and so forth, and also for a compound having no liquid crystal phase but being useful as a component of a composition. The content ratio of the component is calculated based on the total weight of the liquid crystal composition. The liquid crystal compound herein is a compound represented by formula (A). The compound may be an optically active compound:

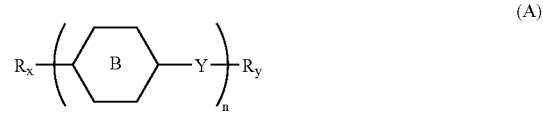

(A)

In formula (A), Rx and Ry are independently hydrogen, alkyl, alkoxy, alkoxyalkyl, alkoxyalkoxy, acyloxy, acyloxyalkyl, alkoxycarbonyl, alkoxycarbonylalkyl, alkenyl, alkenyloxy, alkenyloxyalkyl, alkoxyalkenyl, alkynyl, alkynyloxy, cyano, —NCS, fluorine or chlorine. These groups have 10 or less carbons. In the group having 1 to 5 carbons, arbitrary hydrogen may be replaced by fluorine or chlorine, and the total number of the replaced fluorine and chlorine is 1 to 11. In formula (A), ring B is 1,4-cyclohexylene, 1,4-phenylene, pyrane-2,5-diyl, 1,3-dioxane-2,5-diyl, pyridine-2,5-diyl, pyrimidine-2,5-diyl, decahydronaphthalene-2,6-diyl, 1,2,3,4-tetrahydronaphthalene-2,6-diyl or naphthalene-2,6-diyl. In ring B, arbitrary hydrogen may be replaced by fluorine or chlorine. In ring B, the total number of the replaced fluorine and chlorine is 1 to 4. In the 1,4-phenylene, arbitrary one or two hydrogens may be replaced by cyano, methyl, difluoromethyl or trifluoromethyl. In formula (A), Y represents a single bond, —(CH$_2$)$_2$—, —COO—, —OCO—, —CH$_2$O—, —OCH$_2$—, —CF$_2$O—, —OCF$_2$—, —CH=CH—, —CF=CF—, —(CH$_2$)$_4$—, —(CH$_2$)$_3$—O—, —O—(CH$_2$)$_3$—, —CH=CH—(CH$_2$)$_2$—, —(CH$_2$)$_2$—CH=CH—, —(CH$_2$)$_2$CF$_2$O—, —OCF$_2$(CH$_2$)$_2$—, —(CH$_2$)$_2$COO—, —(CH$_2$)$_2$OCO—, —COO(CH$_2$)$_2$—, —OCO(CH$_2$)$_2$—, —CH=CH—COO—, —CH=CH—OCO—, —COO—CH=CH— or —OCO—CH=CH—. In formula (A), n represents 1, 2, 3 or 4.

A liquid crystal display device having such a display mode as an IPS mode and a VA mode still has a problem as a display device as compared to CRT, and is demanded to be improved in characteristics thereof. The liquid crystal display device driven in an IPS mode or a VA mode is constituted mainly by a liquid crystal composition having a negative dielectric anisotropy, and in order to further improve the characteristics, the liquid crystal composition preferably has the following characteristics (1) to (5), i.e., (1) a wide temperature range of a nematic phase, (2) a low viscosity, (3) a suitable optical anisotropy, (4) a large absolute value of dielectric anisotropy, and (5) a large specific resistance.

The temperature range of a nematic phase relates to a temperature range where the liquid crystal display device is used, and a liquid crystal display device containing a liquid crystal composition having a wide temperature range of a nematic phase as in the item (1) has a wide temperature range where the liquid crystal display device can be used. A liquid crystal display device containing a liquid crystal composition having a small viscosity as in the item (2) has a short response time. A liquid crystal display device having a short response time can be favorably used for displaying a moving image. Furthermore, upon injecting the liquid crystal composition into a liquid crystal cell of the liquid crystal display device, the injection time can be reduced to improve the workability. A liquid crystal display device containing a liquid crystal composition having a suitable optical anisotropy as in the item (3) has a large contrast. A liquid crystal display device containing a liquid crystal composition having a large absolute value of dielectric anisotropy as in the item (4) reduces a threshold voltage, decreases a driving voltage, and reduces an electric power consumption. A liquid crystal display device containing a liquid crystal composition having a large specific resistance as in the item (5) increases a voltage holding ratio and increases a contrast ratio. Therefore, such a liquid crystal composition is preferred that has a large specific resistance in the initial stage and has a large specific resistance even after using for a long period of time.

SUMMARY OF THE INVENTION

The invention concerns a liquid crystal composition having a negative dielectric anisotropy and comprising a first component comprising at least one compound selected from a group of compounds represented by formulas (1-1) to (1-3) and a second component comprising at least one compound selected from a group of compounds represented by formulas (2-1) to (2-3):

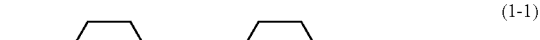

(1-1)

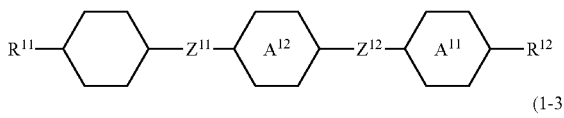

(1-2)

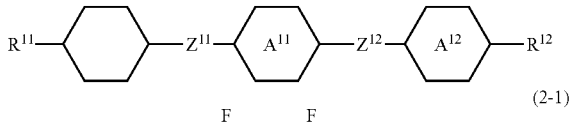

(1-3)

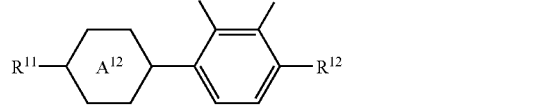

(2-1)

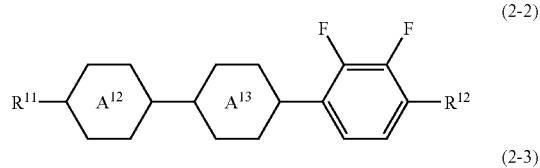

(2-2)

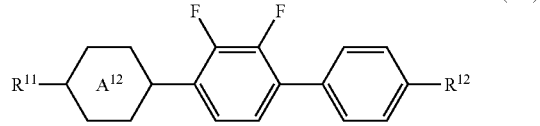

(2-3)

wherein, in formulas (1-1) to (1-3) and formulas (2-1) to (2-3), $R^{11}$ and $R^{12}$ are independently alkyl, alkenyl or alkoxy; ring $A^{11}$ is independently 2-fluoro-1,4-phenylene or 3-fluoro-1,4-phenylene; ring $A^{12}$ is independently 1,4-cyclohexylene or 1,4-phenylene; ring $A^{13}$ is independently 1,4-cyclohexylene or 1,4-phenylene, arbitrary hydrogen of which may be replaced by fluorine or chlorine; and $Z^{11}$ and $Z^{12}$ are independently a single bond, —$C_2H_4$—, $CH_2O$— or —$OCH_2$—; and wherein compounds represented by formula (1-2), wherein ring $A^{11}$ is 2-fluoro-1,4-phenylene, ring $A^{12}$ is 1,4-phenylene, and $Z^{11}$ and $Z^{12}$ are single bonds, and a compound represented by formula (1-3), wherein ring $A^{11}$ is 3-fluoro-1,4-phenylene, ring $A^{12}$ is 1,4-phenylene, and $Z^{11}$ and $Z^{12}$ are single bonds, are excluded.

The inventions also concerns a liquid crystal display device comprising the liquid crystal composition, and so forth.

DETAILED DESCRIPTION OF THE INVENTION

The invention provides a liquid crystal composition that is properly balanced regarding many characteristics among the characteristics such as a wide temperature range of a nematic phase, a small viscosity, a suitable optical anisotropy, a negatively large dielectric anisotropy, and a large specific resistance. The invention also provides a liquid crystal display device containing the composition, and the liquid crystal display device has a large voltage holding ratio and is driven by an active matrix (AM) mode suitable for a VA mode, an IPS mode and so forth.

It has been found that a liquid crystal composition containing (i) a mono-fluorine-replaced liquid crystal compound having a specific structure and (ii) a liquid crystal compound having two or more fluorines having a specific structure has a wide temperature range of a nematic phase, a small viscosity, a suitable optical anisotropy, a negatively large dielectric anisotropy, and a large specific resistance.

The liquid crystal composition of the invention has a wide temperature range of a nematic phase, a small viscosity, a suitable optical anisotropy, a negatively large dielectric anisotropy, and a large specific resistance. The liquid crystal composition of the invention is properly balanced regarding these characteristics. The liquid crystal composition of the invention can have an optical anisotropy in a range of from approximately 0.080 to approximately 0.120 and a dielectric anisotropy in a range of from approximately −6.5 to approximately −2.0. The liquid crystal display device of the invention contains the liquid crystal composition and has a high voltage holding ratio. The liquid crystal display device contains the composition and has a large voltage holding ratio. The liquid crystal display device can be suitably used as a liquid crystal display device driven in an active matrix (AM) mode (hereinafter, sometimes referred to as an AM device) having an operation mode such as a VA mode and an IPS mode.

It has been found that a liquid crystal composition containing (i) a liquid crystal compound having one hydrogen replaced by fluorine having a specific structure and (ii) a liquid crystal compound having two or more fluorines having a specific structure has a wide temperature range of a nematic phase, a small viscosity, a suitable optical anisotropy, a negatively large dielectric anisotropy, and a large specific resistance.

The invention includes:

No. 1. A liquid crystal composition having a negative dielectric anisotropy comprising: a first component comprising at least one compound selected from a group of compounds represented by formulas (1-1) to (1-3) and a second component comprising at least one compound selected from a group of compounds represented by formulas (2-1) to (2-3):

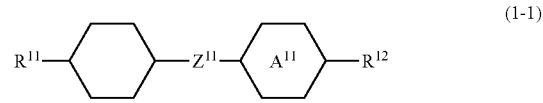

(1-1)

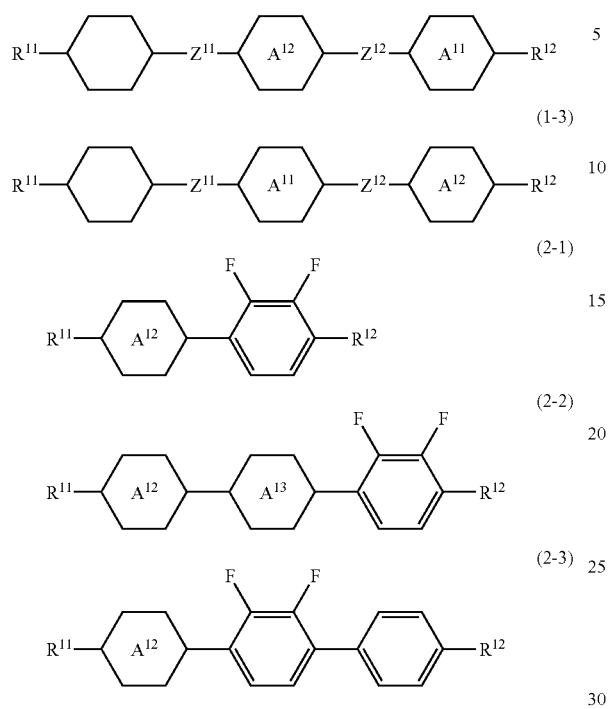

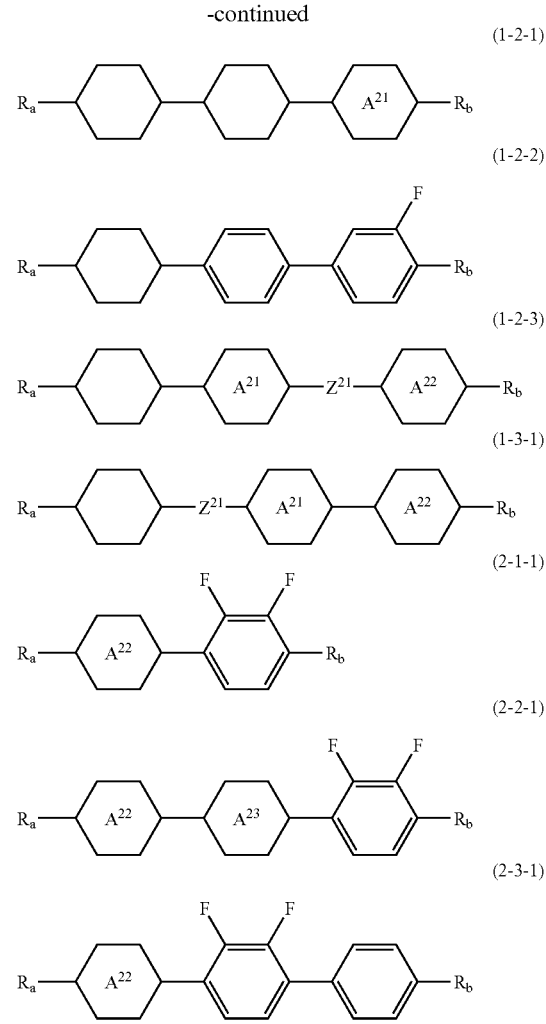

wherein, in formulas (1-1) to (1-3) and formulas (2-1) to (2-3), $R^{11}$ and $R^{12}$ are independently alkyl, alkenyl or alkoxy; ring $A^{11}$ is independently 2-fluoro-1,4-phenylene or 3-fluoro-1,4-phenylene; ring $A^{12}$ is independently 1,4-cyclohexylene or 1,4-phenylene; ring $A^{13}$ is independently 1,4-cyclohexylene or 1,4-phenylene, arbitrary hydrogen of which may be replaced by fluorine or chlorine; and $Z^{11}$ and $Z^{12}$ are independently a single bond, —$C_2H_4$—, —$CH_2O$— or —$OCH_2$—; and wherein compounds represented by formula (1-2), wherein ring $A^{11}$ is 2-fluoro-1,4-phenylene, ring $A^{12}$ is 1,4-phenylene, and $Z^{11}$ and $Z^{12}$ are single bonds, and a compound represented by formula (1-3), wherein ring $A^{11}$ is 3-fluoro-1,4-phenylene, ring $A^{12}$ is 1,4-phenylene, and $Z^{11}$ and $Z^{12}$ are single bonds, are excluded.

No. 2. A liquid crystal composition having a negative dielectric anisotropy comprising: a first component comprising at least one compound selected from a group of compounds represented by formulas (1-1-1), (1-1-2), (1-2-1), (1-2-2), (1-2-3) and (1-3-1) and a second component comprising at least one compound selected from a group of compounds represented by formulas (2-1-1), (2-2-1) and (2-3-1):

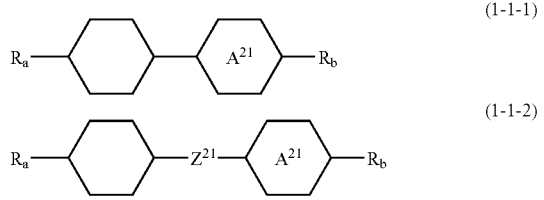

wherein in formulas (1-1-1), (1-1-2), (1-2-1), (1-2-2), (1-2-3), (1-3-1), (2-1-1), (2-2-1) and (2-3-1), $R_a$ is independently alkyl or alkenyl; $R_b$ is independently alkyl, alkenyl or alkoxy; ring $A^{21}$ is independently 2-fluoro-1,4-phenylene or 3-fluoro-1,4-phenylene; ring $A^{22}$ is independently 1,4-cyclohexylene or 1,4-phenylene; ring $A^{23}$ is 1,4-cyclohexylene or 1,4-phenylene, arbitrary hydrogen of which may be replaced by fluorine; and $Z^{21}$ is —$CH_2O$— or —$OCH_2$—.

No. 3. The liquid crystal composition according to No. 2, wherein the first component comprises at least one compound selected from the group of compounds represented by formulas (1-1-1), (1-1-2), (1-2-1), (1-2-2) and (1-2-3) and the second component comprises at least one compound selected from the group of compounds represented by formulas (2-1-1), (2-2-1) and (2-3-1).

No. 4. The liquid crystal composition according to and of Nos. 1 to 3, wherein the content ratio of the first component is from approximately 10% to approximately 80% by weight, and the content ratio of the second component is from approximately 20% to approximately 90% by weight, based on the total weight of the liquid crystal compounds.

No. 5. A liquid crystal composition having a negative dielectric anisotropy comprising: a first component comprising at least one compound selected from a group of compounds represented by formulas (1-1) to (1-3), a second component comprising at least one compound selected from a group of compounds represented by formulas (2-1) to (2-3), and a third component comprising at least one compound selected from a group of compounds represented by formulas (3-1) to (3-3):

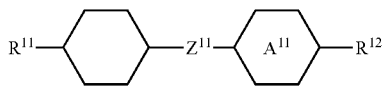 (1-1)

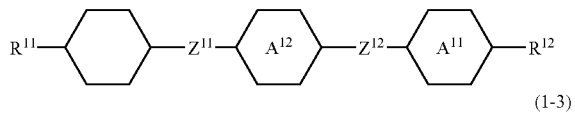 (1-2)

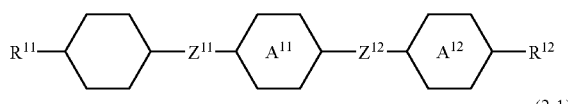 (1-3)

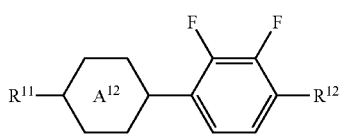 (2-1)

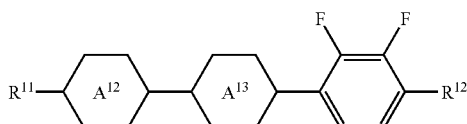 (2-2)

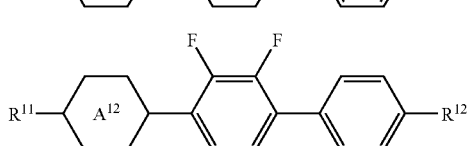 (2-3)

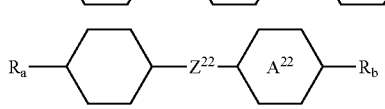 (3-1)

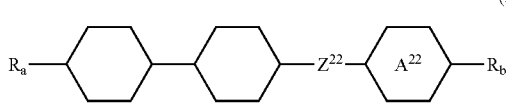 (3-2)

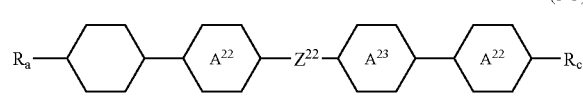 (3-3)

wherein, in formulas (1-1) to (1-3) and formulas (2-1) to (2-3), $R^{11}$ and $R^{12}$ are independently alkyl, alkenyl or alkoxy; ring $A^{11}$ is independently 2-fluoro-1,4-phenylene or 3-fluoro-1,4-phenylene; ring $A^{12}$ is independently 1,4-cyclohexylene or 1,4-phenylene; ring $A^{13}$ is independently 1,4-cyclohexylene or 1,4-phenylene, arbitrary hydrogen of which may be replaced by fluorine or chlorine; and $Z^{11}$ and $Z^{12}$ are independently a single bond, —$C_2H_4$—, —$CH_2O$— or —$OCH_2$—, wherein in formulas (3-1) to (3-3), $R_a$ is independently alkyl or alkenyl; $R_b$ is independently alkyl, alkenyl or alkoxy; $R_c$ is alkyl, alkenyl, alkoxy or alkoxymethyl; plural rings $A^{22}$ are independently 1,4-cyclohexylene or 1,4-phenylene; and ring $A^{23}$ is independently 1,4-cyclohexylene or 1,4-phenylene, arbitrary hydrogen of which may be replaced by fluorine; and $Z^{22}$ represents a single bond, —$CH_2O$—, —$OCH_2$— or —COO—; and wherein compounds represented by formula (1-2), wherein ring $A^{11}$ is 2-fluoro-1,4-phenylene, ring $A^{12}$ is 1,4-phenylene, and $Z^{11}$ and $Z^{12}$ are single bonds, and a compound represented by formula (1-3), wherein ring $A^{11}$ is 3-fluoro-1,4-phenylene, ring $A^{12}$ is 1,4-phenylene, and $Z^{11}$ and $Z^{12}$ are single bonds, are excluded.

No. 6. The liquid crystal composition according to No. 5, wherein the content ratio of the first component is from approximately 5% to approximately 75% by weight, the content ratio of the second component is from approximately 20% to approximately 80% by weight, and the content ratio of the third component is from approximately 5% to approximately 45% by weight, based on the total weight of the liquid crystal compounds.

No. 7. A liquid crystal composition having a negative dielectric anisotropy comprising: a first component comprising at least one compound selected from a group of compounds represented by formulas (1-1-1-1), (1-1-1-2), (1-1-2-1), (1-1-2-2), (1-2-1-1), (1-2-1-2), (1-2-2-1), (1-2-3-1) and (1-2-3-2) and a second component comprising at least one compound selected from a group of compounds represented by formulas (2-1-1-1), (2-2-1-1), (2-2-1-2), (2-2-1-3), (2-2-1-4) and (2-2-1-5):

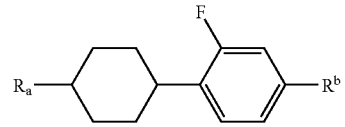 (1-1-1-1)

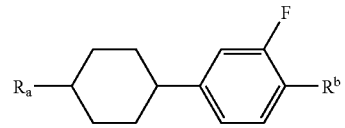 (1-1-1-2)

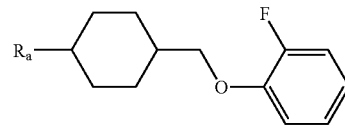 (1-1-2-1)

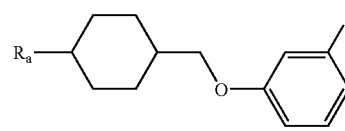 (1-1-2-2)

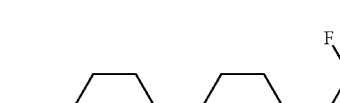 (1-2-1-1)

 (1-2-1-2)

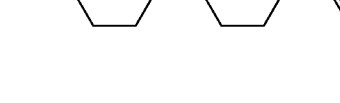 (1-2-2-1)

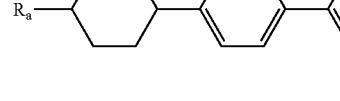 (1-2-3-1)

-continued

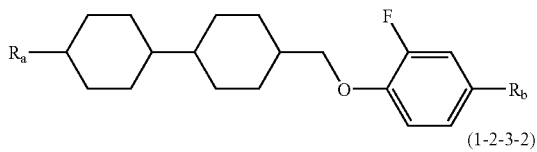
(1-2-3-1)

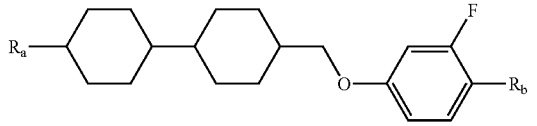
(1-2-3-2)

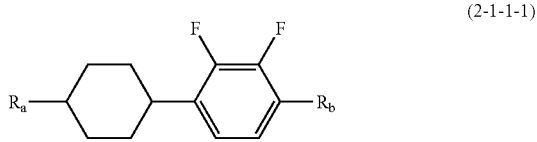
(2-1-1-1)

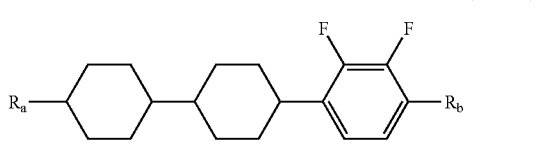
(2-2-1-1)

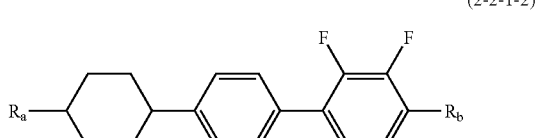
(2-2-1-2)

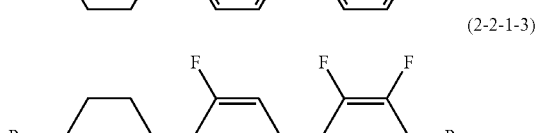
(2-2-1-3)

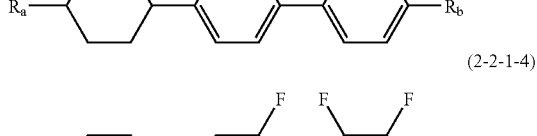
(2-2-1-4)

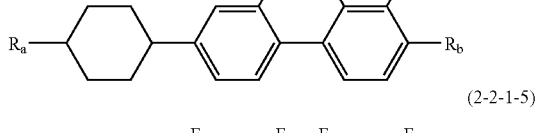
(2-2-1-5)

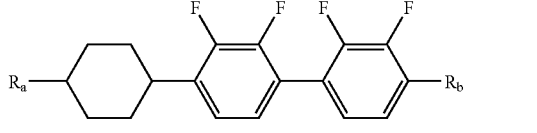

wherein in formulas (1-1-1-1), (1-1-1-2), (1-1-2-1), (1-1-2-2), (1-2-1-1), (1-2-1-2), (1-2-2-1), (1-2-3-1), (1-2-3-2), (2-1-1-1), (2-2-1-1), (2-2-1-2), (2-2-1-3), (2-2-1-4) and (2-2-1-5), $R_a$ is independently alkyl or alkenyl; and $R_b$ is independently alkyl, alkenyl or alkoxy.

No. 8. The liquid crystal composition according to No. 7, wherein the first component comprises at least one compound selected from the group of compounds represented by formulas (1-1-1-1), (1-1-2-1), (1-2-1-1) and (1-2-3-1) and the second component comprises at least one compound selected from the group of compounds represented by formulas (2-1-1-1) and (2-2-1-1) to (2-2-1-5).

No. 9. The liquid crystal composition according to No. 7, wherein the first component comprises at least one compound selected from the group of compounds represented by formulas (1-1-1-1), (1-1-1-2), (1-2-1-1), (1-2-1-2) and (1-2-2-1) and the second component comprises at least one compound selected from the group of compounds represented by formulas (2-1-1-1) and (2-2-1-1) to (2-2-1-5).

No. 10. The liquid crystal composition according to No. 7, wherein the first component comprises at least one compound selected from the group of compounds represented by formulas (1-1-1-1), (1-1-2-1), (1-2-1-1) and (1-2-3-1) and the second component comprises at least one compound selected from the group of compounds represented by formulas (2-1-1-1), (2-2-1-1) and (2-2-1-2).

No. 11. The liquid crystal composition according to No. 7, wherein the first component comprises at least one compound selected from the group of compounds represented by formulas (1-1-2-1), (1-1-2-2), (1-2-3-1) and (1-2-3-2) and the second component comprises at least one compound selected from the group of compounds represented by formulas (2-1-1-1), (2-2-1-1) and (2-2-1-2).

No. 12. The liquid crystal composition according to No. 7, wherein the first component comprises at least one compound selected from the group of compounds represented by formulas (1-1-2-1) and (1-2-3-1) and the second component comprises at least one compound selected from the group of compounds represented by formulas (2-1-1-1), (2-2-1-1) and (2-2-1-2).

No. 13. The liquid crystal composition according to any of Nos. 7 to 12, wherein the content ratio of the first component is from approximately 30% to approximately 75% by weight and the content ratio of the second component is from approximately 25% to approximately 70% by weight, based on the total weight of the liquid crystal compounds.

No. 14. A liquid crystal composition having a negative dielectric anisotropy comprising: a first component comprising at least one compound selected from a group of compounds represented by formulas (1-1-1-1), (1-1-1-2), (1-1-2-1), (1-1-2-2), (1-2-1-1), (1-2-1-2), (1-2-2-1), (1-2-3-1) and (1-2-3-2), a second component comprising at least one compound selected from a group of compounds represented by formulas (2-1-1-1), (2-2-1-1), (2-2-1-2), (2-2-1-3), (2-2-1-4) and (2-2-1-5), and a third component comprising at least one compound selected from a group of compounds represented by formulas (3-1-1), (3-1-2), (3-2-1), (3-3-1) and (3-3-2):

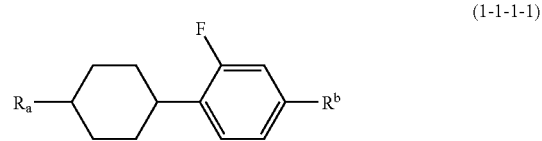
(1-1-1-1)

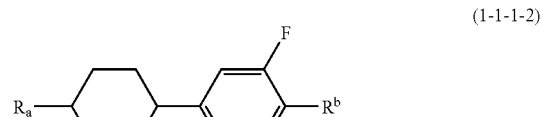
(1-1-1-2)

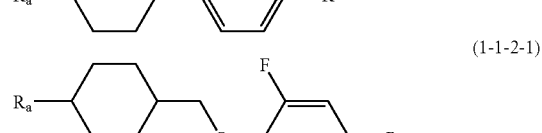
(1-1-2-1)

-continued (1-1-2-2)
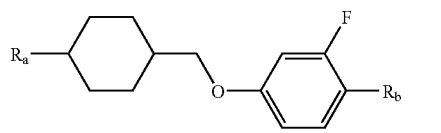

(1-2-1-1)
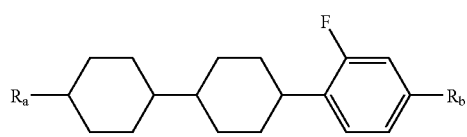

(1-2-1-2)
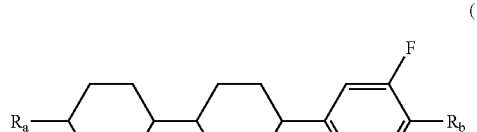

(1-2-2-1)
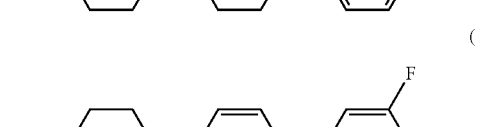

(1-2-3-1)
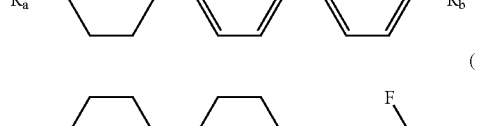

(1-2-3-2)
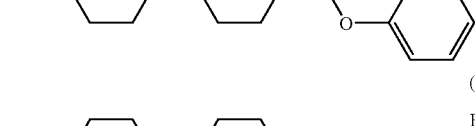

(2-1-1-1)
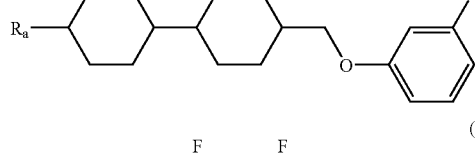

(2-2-1-1)
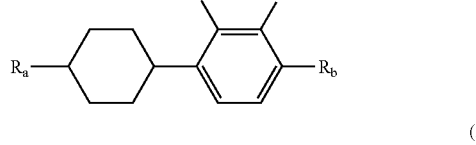

(2-2-1-2)
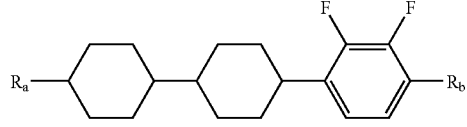

(2-2-1-3)
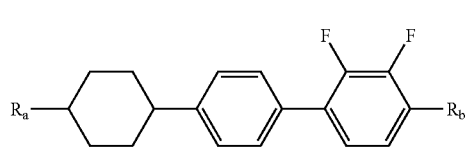

-continued (2-2-1-4)
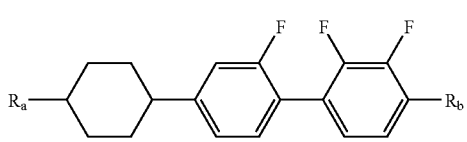

(2-2-1-5)
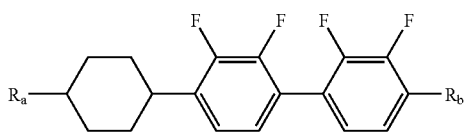

(3-1-1)
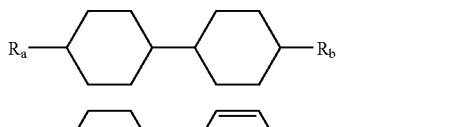

(3-1-2)

(3-2-1)
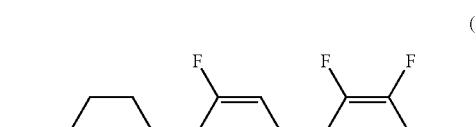

(3-3-1)
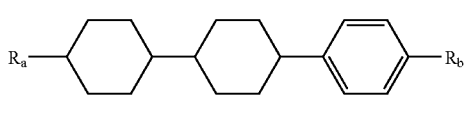

(3-3-2)
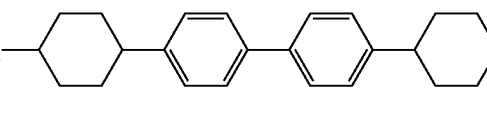

wherein in formulas (1-1-1-1), (1-1-1-2), (1-1-2-1), (1-1-2-2), (1-2-1-1), (1-2-1-2), (1-2-2-1), (1-2-3-1), (1-2-3-2), (2-1-1-1), (2-2-1-1), (2-2-1-2), (2-2-1-3), (2-2-1-4) and (2-2-1-5), (3-1-1), (3-1-2), (3-2-1), (3-3-1) and (3-3-2), $R_a$ is independently alkyl or alkenyl; $R_b$ is independently alkyl, alkenyl or alkoxy; and $R_c$ is independently alkyl, alkenyl, alkoxy or alkoxymethyl.

No. 15. The liquid crystal composition according to No. 14, wherein the third component comprises at least one compound selected from the group of compounds represented by formulas (3-1-1), (3-1-2) and (3-2-1).

No. 16. The liquid crystal composition according to No. 14, wherein the third component comprises at least one compound selected from the group of compounds represented by formula (3-2-1).

No. 17. The liquid crystal composition according to any of Nos. 14 to 16, wherein the content ratio of the first component is from approximately 10% to approximately 65% by weight, the content ratio of the second component is from approximately 25% to approximately 60% by weight and the content ratio of the third component is from approximately 5% to approximately 35% by weight, based on the total weight of the liquid crystal compounds.

No. 18. A liquid crystal composition having a negative dielectric anisotropy consisting essentially of: a first component comprising at least one compound selected from a group of compounds represented by formulas (1-1-1), (1-1-2), (1-2-1), (1-2-2), (1-2-3) and (1-3-1), a second component comprising at least one compound selected from a group of compounds represented by formulas (2-1-1), (2-2-1) and (2-3-1), and a third component comprising at least one compound selected from a group of compounds represented by formulas (3-1) to (3-3).

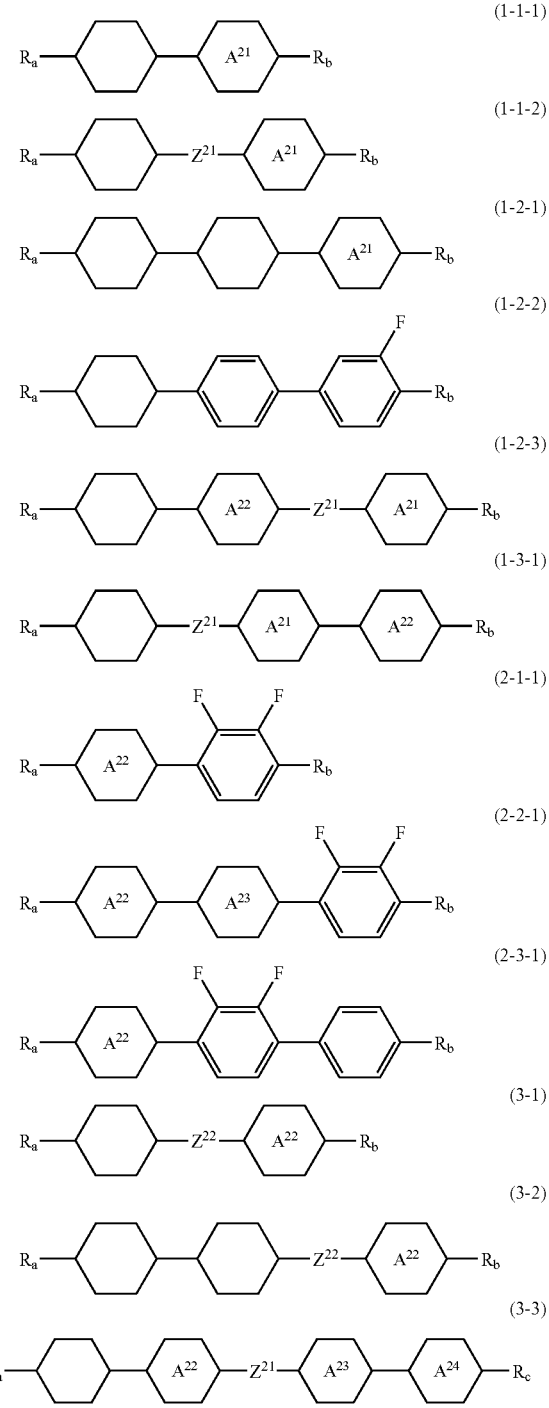

wherein in formulas (1-1-1), (1-1-2), (1-2-1), (1-2-2), (1-2-3), (1-3-1), (2-1-1), (2-2-1), (2-3-1) and (3-1) to (3-3), $R_a$ is independently alkyl or alkenyl; $R_b$ is independently alkyl, alkenyl or alkoxy; $R_c$ is alkyl, alkenyl, alkoxy or alkoxymethyl; ring $A^{21}$ is independently 2-fluoro-1,4-phenylene or 3-fluoro-1,4-phenylene; ring $A^{22}$ is independently 1,4-cyclohexylene or 1,4-phenylene; ring $A^{23}$ is 1,4-cyclohexylene or 1,4-phenylene, arbitrary hydrogen of which may be replaced by fluorine; and $Z^{21}$ is independently —CH$_2$O— or —OCH$_2$—; $Z^{22}$ is independently a single bond, —CH$_2$O—, —OCH$_2$— or —COO.

No. 19. The liquid crystal composition according to No. 2, wherein the liquid crystal composition consists essentially of: a first component comprising at least one compound selected from a group of compounds represented by formulas (1-1-1), (1-1-2), (1-2-1), (1-2-2), (1-2-3) and (1-3-1) and a second component comprising at least one compound selected from a group of compounds represented by formulas (2-1-1), (2-2-1) and (2-3-1).

No. 20. The liquid crystal composition according to any of Nos. 1 to 19, wherein the liquid crystal composition has a dielectric anisotropy in a range of approximately −6.5 to approximately −2.0.

No. 21. The liquid crystal composition according to any of Nos. 1 to 20, wherein the liquid crystal composition has an optical anisotropy in a range of approximately 0.080 to approximately 0.120.

No. 22. A liquid crystal display device comprising the liquid crystal composition according to any of Nos. 1 to 21.

No. 23. The liquid crystal display device according to No. 22, wherein the liquid crystal display device is driven in an active matrix mode and is displayed in at least one of a VA mode and an IPS mode.

The liquid crystal composition of the invention contains a liquid crystal compound containing one fluorine and having a specific structure as a first component, and a liquid crystal compound containing two or more fluorines and having a specific structure as a second component, and also contains, depending on necessity, a liquid crystal composition having a specific structure as a third component.

With respect to the first through third components, the structures of the compounds used in the components, the characteristics and effects of the components, and specific examples and preferred examples of the components are described below.

First Component

The liquid crystal compound as the first component of the liquid crystal composition of the invention is a liquid crystal compound represented by formulas (1-1) to (1-3):

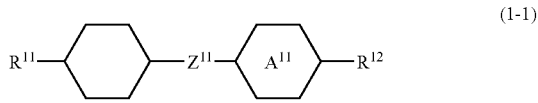

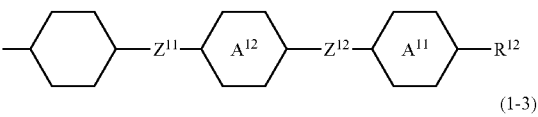

In formulas (1-1) to (1-3), independently, $R^{11}$, $R^{12}$, ring $A^{11}$, ring $A^{12}$, $Z^{11}$ and $Z^{12}$ are defined as follows:

$R^{11}$ and $R^{12}$ are independently alkyl, alkenyl or alkoxy.

Among the alkyl, alkyl having 1 to 20 carbons are preferred, alkyl having 1 to 10 carbons are more preferred, methyl, ethyl, propyl, butyl, pentyl, hexyl, heptyl and octyl are further preferred, and ethyl propyl, butyl, pentyl and heptyl are particularly preferred.

Among the alkenyl, alkenyl having 2 to 20 carbons are preferred, alkenyl having 2 to 10 carbons are more preferred, vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl and 5-hexenyl are further preferred, and vinyl, 1-propenyl, 3-butenyl and 3-pentenyl are particularly preferred.

In the case where $R^{11}$ or $R^{12}$ is the alkenyl, the steric configuration of —CH=CH— depends on the position of the double bond. In the case where $R^{11}$ or $R^{12}$ is a group having a double bond starting from a carbon with an odd position number, such as 1-propenyl, 1-butenyl, 1-pentenyl, 1-hexenyl, 3-pentenyl, 3-hexenyl or 5-hexenyl, a trans configuration is preferred. In the case where $R^{11}$ or $R^{12}$ is a group having a double bond starting from a carbon with an even position number, such as 2-propenyl, 2-butenyl, 2-pentenyl, 4-pentenyl, 2-hexenyl or 4-hexenyl, a cis configuration is preferred.

Among the alkoxy, alkoxy having 1 to 20 carbons are preferred, alkyl having 1 to 10 carbons are more preferred, methoxy, ethoxy, propoxy, butoxy, penthyloxy, hexyloxy and heptyloxy are further preferred, and methoxy, ethoxy and butoxy are particularly preferred.

Ring $A^{11}$ is independently 2-fluoro-1,4-phenylene or 3-fluoro-1,4-phenylene, ring $A^{12}$ is independently 1,4-cyclohexylene or 1,4-phenylene, and $Z^{11}$ and $Z^{12}$ are independently a single bond, —C$_2$H$_4$—, —CH$_2$O— or —OCH$_2$—. In the case where the ring contained in the compound represented by formulas (1-1) to (1-3) is 1,4-cyclohexylene, the steric configuration thereof is preferably a trans configuration.

A compound represented by formula (1-2), wherein ring $A^{11}$ is 2-fluoro-1,4-phenylene, ring $A^{12}$ is 1,4-phenylene, and $Z^{11}$ and $Z^{12}$ are single bonds, and a compound represented by formula (1-3), wherein ring $A^{11}$ is 3-fluoro-1,4-phenylene, ring $A^{12}$ is 1,4-phenylene, and $Z^{11}$ and $Z^{12}$ are single bonds, are excluded.

One of the characteristic features of the compound represented by formulas (1-1) to (1-3) resides in that the compound contains only one fluorine and has 2-fluoro-1,4-phenylene or 3-fluoro-1,4-phenylene as a fluorine-containing group. Owing to the structure of the liquid crystal compound as the first component, the liquid crystal composition of the invention can have a negatively large dielectric anisotropy and a low minimum temperature of a nematic phase.

Among the liquid crystal compounds represented by formulas (1-1) to (1-3), compounds represented by formulas (1-1-1), (1-1-2), (1-2-1) to (1-2-3) and (1-3-1) are preferred:

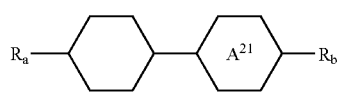

(1-1-1)

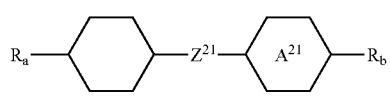

(1-1-2)

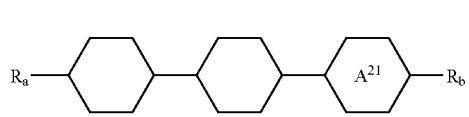

(1-2-1)

-continued

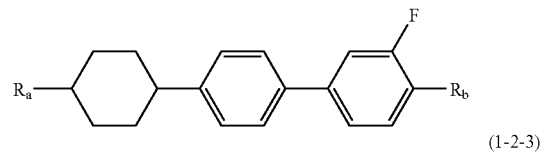

(1-2-2)

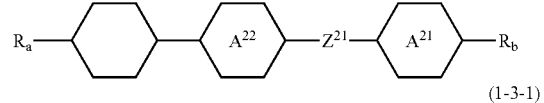

(1-2-3)

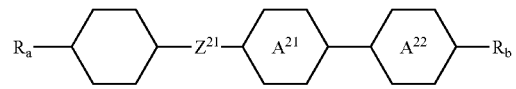

(1-3-1)

In formulas (1-1-1), (1-1-2), (1-2-1) to (1-2-3) and (1-3-1), independently, $R_a$, $R_b$, ring $A^{21}$, ring $A^{22}$ and $Z^{21}$ are defined as follows:

$R_a$ is alkyl or alkenyl. Preferred embodiments of the alkyl and alkenyl are the same as in $R^{11}$. $R_b$ is alkyl, alkenyl or alkoxy. Preferred embodiments of the alkyl, alkenyl and alkoxy are the same as in $R^{11}$.

Ring $A^{21}$ is 2-fluoro-1,4-phenylene or 3-fluoro-1,4-phenylene. Ring $A^{22}$ is 1,4-cyclohexylene or 1,4-phenylene.

$Z^{21}$ is —CH$_2$O— or —OCH$_2$—.

In the case where the liquid crystal compound as the first component of the liquid crystal composition of the invention is a compound represented by the aforementioned formulas, the liquid crystal composition can have a negatively larger dielectric anisotropy and can have a low minimum temperature of a nematic phase.

Among the compounds, the liquid crystal compound represented by formulas (1-1-1) and (1-1-2) has, as compared to an ordinary liquid crystal compound, such characteristics as a moderate viscosity, a moderate optical anisotropy, a moderate negative dielectric anisotropy, and a large specific resistance, while the maximum temperature of a nematic phase is not high.

Among the compounds, the liquid crystal compound represented by formulas (1-2-1) and (1-2-2) has, as compared to an ordinary liquid crystal compound, such characteristics as a high maximum temperature of a nematic phase, a moderate viscosity, a moderate to large optical anisotropy, a moderate negative dielectric anisotropy, and a large specific resistance.

Among the compounds, the liquid crystal compound represented by formula (1-2-3) has, as compared to an ordinary liquid crystal compound, such characteristics as a high maximum temperature of a nematic phase, a moderate to large viscosity, a moderate optical anisotropy, a moderate negative dielectric anisotropy, and a large specific resistance.

Among the compounds, the liquid crystal compound represented by formula (1-3-1) has, as compared to an ordinary liquid crystal compound, such characteristics as a high maximum temperature of a nematic phase, a moderate to large viscosity, a moderate to large optical anisotropy, a moderate negative dielectric anisotropy, and a large specific resistance.

Among the compounds represented by formulas (1-1-1), (1-1-2), (1-2-1) to (1-2-3) and (1-3-1), compounds represented by formulas (1-1-1), (1-1-2), (1-2-1) to (1-2-3) are preferred.

In the case where the liquid crystal compound as the first component is a compound represented by the aforementioned formulas, the temperature range of a nematic phase can be widely controlled, and the liquid crystal composition can have a negatively large dielectric anisotropy.

Among the compounds represented by formulas (1-1-1), (1-1-2), (1-2-1) to (1-2-3) and (1-3-1), compounds represented by formulas (1-1-1-1), (1-1-1-2), (1-1-2-1), (1-1-2-2), (1-2-1-1), (1-2-1-2), (1-2-2-1), (1-2-3-1) and (1-2-3-2) are more preferred.

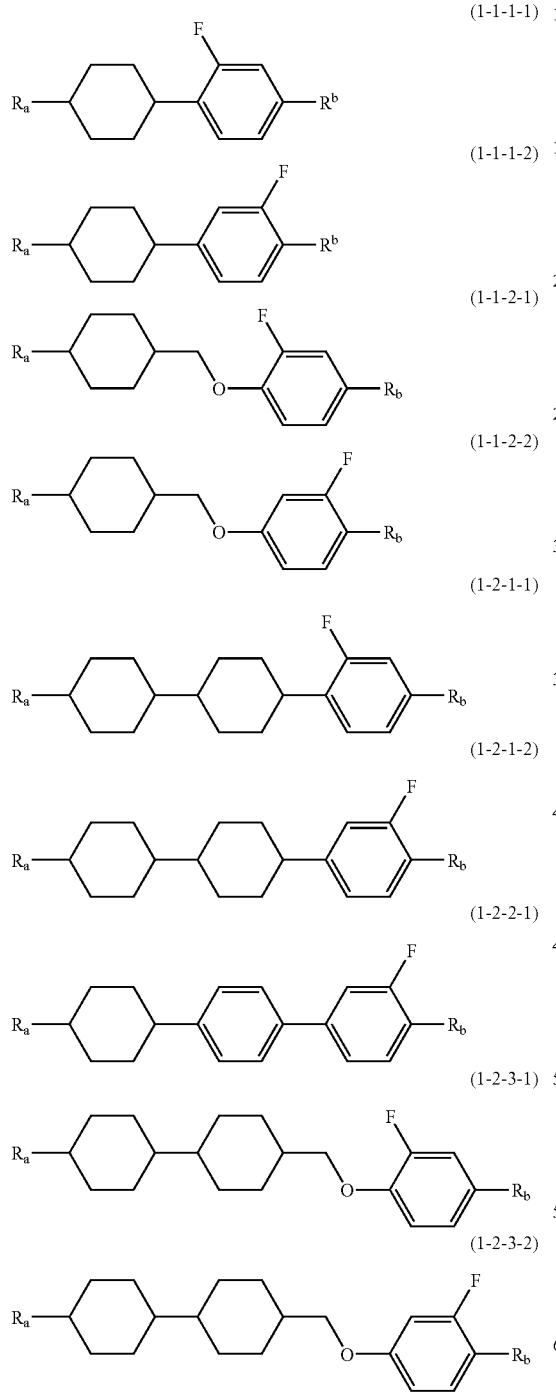

In formulas (1-1-1-1), (1-1-1-2), (1-1-2-1), (1-1-2-2), (1-2-1-1), (1-2-1-2), (1-2-2-1), (1-2-3-1) and (1-2-3-2), $R_a$ is independently alkyl or alkenyl, and preferred embodiments of the alkyl and alkenyl are the same as in $R^{11}$. $R_b$ is independently alkyl, alkenyl or alkoxy, and preferred embodiments of the alkyl, alkenyl and alkoxy are the same as in $R^{11}$.

In the case where the liquid crystal compound as the first component of the liquid crystal composition of the invention is a compound represented by the aforementioned formulas, the liquid crystal composition can have a negatively large dielectric anisotropy. Furthermore, the temperature range of a nematic phase can be easily changed by changing the content ratio of the first component with respect to the total weight of the liquid crystal composition.

Among the compounds, the liquid crystal compounds represented by formulas (1-1-1-1), (1-1-2-1), (1-2-1-1) and (1-2-3-1) are preferred, and the liquid crystal compounds represented by formulas (1-1-2-1) and (1-2-3-1) are more preferred. In the case where the first component is the aforementioned compound, in particular, the dielectric anisotropy of the liquid crystal composition can be negatively large.

In the case where the first component is the liquid crystal compound represented by formulas (1-1-1-1), (1-1-1-2), (1-2-1-1), (1-2-1-2) and (1-2-2-1), the viscosity of the liquid crystal compound can be further small.

The liquid crystal compounds may be used as the first component solely or as a combination of plural kinds thereof.

Second Component

The liquid crystal compound as the second component of the liquid crystal composition of the invention is a liquid crystal compound represented by formulas (2-1) to (2-3):

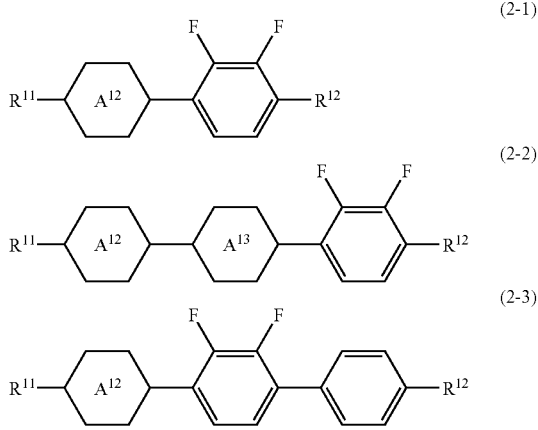

In formulas (2-1) to (2-3), $R^{11}$, $R^{12}$ and ring $A^{12}$ are the same as in the compound represented by formulas (1-1) to (1-3) as the first component. In formulas (2-1) to (2-3), ring $A^{13}$ is independently 1,4-cyclohexylene or 1,4-phenylene, arbitrary hydrogen of which may be replaced by fluorine or chlorine.

One of the characteristic features of the compound represented by formulas (2-1) to (2-3) resides in that the compound contains two or more fluorines and has 2,3-difluoro-1,4-phenylene as a fluorine-containing group. Owing to the structure of the liquid crystal compound as the second component, the liquid crystal composition of the invention can have a negatively large dielectric anisotropy.

Among the liquid crystal compounds represented by formulas (2-1) to (2-3), compounds represented by formulas (2-1-1), (2-2-1) and (2-3-1) are preferred:

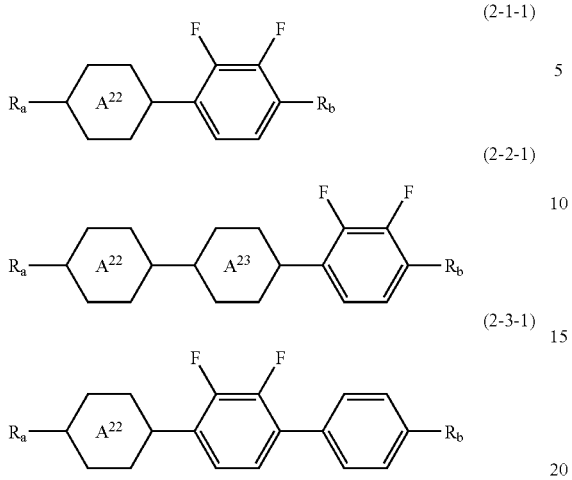

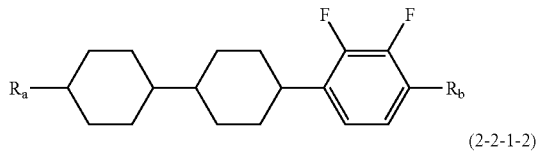

In formulas (2-1-1), (2-2-1) and (2-3-1), $R_a$, $R_b$, and ring $A^{22}$ are the same as in the compound represented by formulas (1-1-1), (1-1-2), (1-2-1) to (1-2-3) and (1-3-1) as the first component. In formulas (2-1-1), (2-2-1) and (2-3-1), ring $A^{23}$ is 1,4-cyclohexylene or 1,4-phenylene, arbitrary hydrogen of which may be replaced by fluorine or chlorine.

In the case where the liquid crystal compound as the second component of the liquid crystal composition of the invention is a compound represented by the aforementioned formulas, the liquid crystal composition can have a negatively larger dielectric anisotropy.

Among the compounds, the liquid crystal compound represented by formula (2-1-1) has, as compared to an ordinary liquid crystal compound, such characteristics as a moderate viscosity, a moderate to relatively large optical anisotropy, a moderate to relatively large negative dielectric anisotropy, and a large specific resistance, while the maximum temperature of a nematic phase is not high.

Among the compounds, the liquid crystal compound represented by formula (2-2-1) has, as compared to an ordinary liquid crystal compound, such characteristics as a moderate to high maximum temperature of a nematic phase, a moderate to large viscosity, a moderate to large optical anisotropy, a negatively large dielectric anisotropy, and a large specific resistance.

Among the compounds, the liquid crystal compound represented by formula (2-3-1) has, as compared to an ordinary liquid crystal compound, such characteristics as a moderate to high maximum temperature of a nematic phase, a moderate to large viscosity, a moderate to large optical anisotropy, a negatively large dielectric anisotropy, and a large specific resistance.

Among the compounds represented by formulas (2-1-1), (2-2-1) and (2-3-1), compounds represented by formulas (2-1-1-1), (2-2-1-1), (2-2-1-2), (2-2-1-3), (2-2-1-4) and (2-2-1-5) are more preferred.

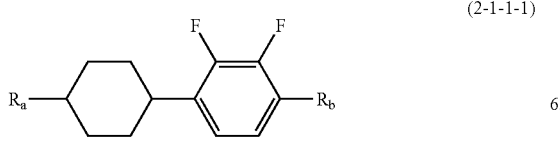

In formulas (2-1-1-1), (2-2-1-1), (2-2-1-2), (2-2-1-3), (2-2-1-4) and (2-2-1-5), $R_a$ is independently alkyl or alkenyl, and preferred embodiments of the alkyl and alkenyl are the same as in $R^{11}$ of the compound represented by formulas (1-1) to (1-3) as the first component. $R_b$ is independently alkyl, alkenyl or alkoxy, and preferred embodiments of the alkyl, alkenyl and alkoxy are the same as in $R^{11}$.

In the case where the liquid crystal compound as the second component of the liquid crystal composition of the invention is a compound represented by the aforementioned formulas, the liquid crystal composition can have a negatively large dielectric anisotropy. Furthermore, the optical anisotropy can be easily changed by changing the content ratio of the second component with respect to the total weight of the liquid crystal composition.

Among the compounds, the liquid crystal compounds represented by formulas (2-1-1-1), (2-2-1-1) and (2-2-1-2) are preferred. In the case where the second component is the aforementioned compound, the liquid crystal composition can have a higher maximum temperature of a nematic phase and a negatively large dielectric anisotropy. Furthermore, the optical anisotropy can be easily changed by changing the content ratio of the second component with respect to the total weight of the liquid crystal composition. The viscosity of the liquid crystal composition can be small as compared to the other second component, such as the compounds represented by formulas (2-2-1-3), (2-2-1-4) and (2-2-1-5).

The liquid crystal compounds may be used as the second component solely or as a combination of plural kinds thereof.

Third Component

The liquid crystal compound as the third component of the liquid crystal composition of the invention is a liquid crystal compound represented by formulas (3-1) to (3-3):

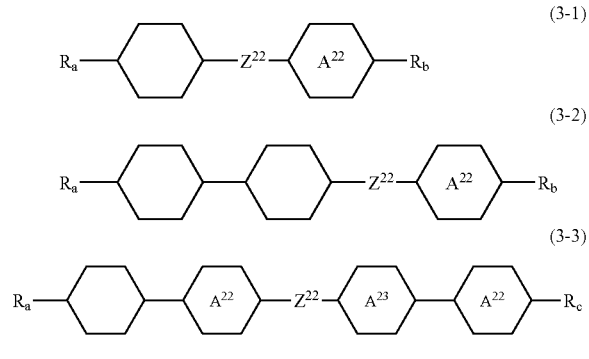

In formulas (3-1) to (3-3), $R_a$ is independently alkyl or alkenyl, and preferred embodiments of the alkyl and alkenyl are the same as in $R^{11}$ of the compound represented by formulas (1-1) to (1-3) as the first component. $R_b$ is independently alkyl, alkenyl or alkoxy, and preferred embodiments of the alkyl, alkenyl and alkoxy are the same as in $R^{11}$.

In formulas (3-1) to (3-3), $R_c$ is alkyl, alkenyl, alkoxy or alkoxymethyl. Preferred embodiments of the alkyl, alkenyl and alkoxy are the same as in $R^{11}$. Among the alkoxymethyl, alkoxymethyl having 2 to 20 carbons are preferred, alkoxymethyl having 2 to 10 carbons are more preferred, methoxymethyl, ethoxymethyl, propoxymethyl, butoxymethyl and pentyloxy methyl are further preferred, and methoxymethyl is particularly preferred.

In formulas (3-1) to (3-3), $Z^{22}$ represents a single bond, —$CH_2O$—, —$OCH_2$— or —COO—.

In formulas (3-1) to (3-3), plural rings $A^{22}$ are independently 1,4-cyclohexylene or 1,4-phenylene, and ring $A^{23}$ is independently 1,4-cyclohexylene or 1,4-phenylene, arbitrary hydrogen of which may be replaced by fluorine or chlorine.

Owing to the structure of the liquid crystal compound as the third component, the liquid crystal composition of the invention can have a small viscosity. Furthermore, the maximum temperature of a nematic phase and the optical anisotropy can be easily changed by changing the content ratio of the third component with respect to the total weight of the liquid crystal composition.

Among the compounds, the liquid crystal compound represented by formula (3-1) has, as compared to an ordinary liquid crystal compound, such characteristics as a small viscosity, a small to moderate optical anisotropy, an extremely small negative dielectric anisotropy, and a large specific resistance, while the maximum temperature of a nematic phase is not high.

Among the compounds, the liquid crystal compound represented by formula (3-2) has, as compared to an ordinary liquid crystal compound, such characteristics as a moderate maximum temperature of a nematic phase, a small viscosity, a moderate optical anisotropy, an extremely small negative dielectric anisotropy, and a large specific resistance.

Among the compounds, the liquid crystal compound represented by formula (3-3) has, as compared to an ordinary liquid crystal compound, such characteristics as an extremely high maximum temperature of a nematic phase, a moderate viscosity, a moderate optical to large anisotropy, an extremely small negative dielectric anisotropy, and a large specific resistance.

Among the liquid crystal compounds represented by formulas (3-1) to (3-3), compounds represented by formulas (3-1-1), (3-1-2), (3-2-1), (3-3-1) and (3-3-2) are preferred:

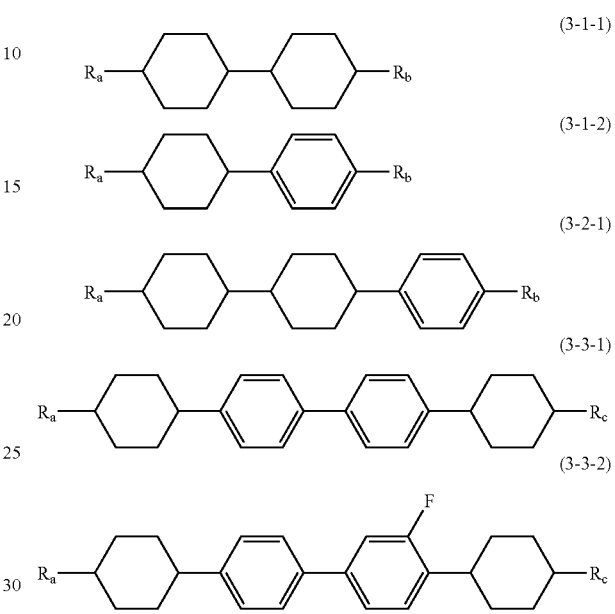

$R_a$, $R_b$, and $R_c$ are the same as in the compound represented by formulas (3-1) to (3-3).

In the case where the liquid crystal compound as the third component is a compound represented by the aforementioned formulas, the liquid crystal composition can have a small viscosity.

Among the compounds, the compound represented by formulas (3-1-1), (3-1-2) and (3-2-1) is preferred, and the compound represented by formula (3-2-1) is more preferred. In the case where the third component is the compound, the liquid crystal composition can have a smaller viscosity.

The liquid crystal compounds may be used as the third component solely or as a combination of plural kinds thereof.

Synthesis Method of Liquid Crystal Compounds

The preparation methods of the liquid crystal compounds as the first to third components will be explained.

The compounds represented by formulas (2-1) and (2-2) include compounds represented by formulas (2-1-1-1) and (2-2-1-1) to (2-2-1-5), and can be synthesized by the methods disclosed in Japanese Patent No. 2811342.

The compounds represented by formula (3-1) include compounds represented by formulas (3-1-1) and so forth, and can be synthesized by the methods disclosed in JP S59-70624A/1984 or JP S60-16940A/1985.

The compounds for which preparation methods were not described above can be prepared according to the methods described in ORGANIC SYNTHESES (John Wiley & Sons, Inc.), ORGANIC REACTIONS (John Wiley & Sons, Inc.), COMPREHENSIVE ORGANIC SYNTHESIS (Pergamon Press), NEW EXPERIMENTAL CHEMISTRY COURSE (Shin Jikken Kagaku Kouza) (Maruzen, Inc.), and so forth.

Liquid Crystal Composition (1)

Combinations of the components of the composition and preferred ratios of the components will be described.

One of the characteristic features of the liquid crystal composition of the invention resides in the combination of the first component and the second component (hereinafter, sometimes referred to as a liquid crystal composition (1)).

Owing to the combination of the two components, the dielectric anisotropy of the composition can be negatively large, and the minimum temperature of a nematic phase of the composition can be low. As compared to a liquid crystal composition containing only the second component and the third component, such a liquid crystal composition obtained by replacing the third component with the first component while maintaining the content ratio of the second component can have a negatively large dielectric anisotropy. Furthermore, a liquid crystal composition containing only the second component and the third component cannot have a negatively large dielectric anisotropy while maintaining the minimum temperature of a nematic phase in some cases.

The content ratios of the first component and the second component in the liquid crystal composition (1) of the invention are not particularly limited. It is preferred that the content ratio of the first component is from approximately 10% to approximately 80% by weight, and the content ratio of the second component is from approximately 20% to approximately 90% by weight, and it is more preferred that the content ratio of the first component is from approximately 30% to approximately 75% by weight, and the content ratio of the second component is from approximately 25% to approximately 70% by weight, based on the total weight of the liquid crystal compounds in the liquid crystal composition (1).

In the case where the content ratios of the first component and the second component are in the aforementioned ranges, the liquid crystal composition can have an enhanced temperature range of a nematic phase, a suitable optical anisotropy, a dielectric anisotropy in a suitable range, a small viscosity, and a large specific resistance.

Liquid Crystal Composition (2)

The liquid crystal composition of the invention preferably contains the third component in addition to the first and second components (hereinafter, sometimes referred to as a liquid crystal composition (2)). Owing to the combination of the components, the liquid crystal composition can have a negatively large dielectric anisotropy and an enhanced temperature range of a nematic phase. The content ratios of the first component, the second component and the third component in the liquid crystal composition (2) of the invention are not particularly limited. It is preferred that the content ratio of the first component is from approximately 5% to approximately 75% by weight, the content ratio of the second component is from approximately 20% to approximately 80% by weight, and the content ratio of the third component is from approximately 5% to approximately 45% by weight, and it is more preferred that the content ratio of the first component is from approximately 10% to approximately 65% by weight, the content ratio of the second component is from approximately 25% to approximately 60% by weight, and the content ratio of the third component is from approximately 5% to approximately 35% by weight, based on the total weight of the liquid crystal compounds in the liquid crystal composition (2).

In the case where the content ratios of the first component, the second component and the third component of the liquid crystal composition (2) are in the aforementioned ranges, the liquid crystal composition can have an enhanced temperature range of a nematic phase, a suitable optical anisotropy, a dielectric anisotropy in a suitable range, a small viscosity, and a large specific resistance.

Embodiments of Liquid Crystal Composition

The liquid crystal composition of the invention may contain, in addition to the first and second components and the third component added depending on necessity, another liquid crystal compound in some cases for controlling the characteristics of the liquid crystal composition. The liquid crystal composition of the invention may not contain any other liquid crystal compound than the first and second components and the third component added depending on necessity from the standpoint, for example, of cost.

The liquid crystal composition of the invention may further contain an additive, such as an optically active compound, a coloring matter, a defoaming agent, an ultraviolet ray absorbent and an antioxidant.

In the case where an optically active compound is added to the liquid crystal composition of the invention, a helical structure can be induced in the liquid crystal to apply a twist angle thereto.

In the case where a coloring matter is added to the liquid crystal composition of the invention, the composition can be applied to a liquid crystal display device having a guest host (GH) mode.

In the case where a defoaming agent is added to the liquid crystal composition of the invention, the composition can be prevented from being foamed during transportation of the liquid crystal composition or during the production process of a liquid crystal display device with the liquid crystal composition.

In the case where an ultraviolet ray absorbent or an antioxidant is added to the liquid crystal composition of the invention, the liquid crystal composition or a liquid crystal display device containing the liquid crystal composition can be prevented from being deteriorated. For example, an antioxidant can suppress the specific resistance from being decreased upon heating the liquid crystal composition.

Examples of the ultraviolet ray absorbent include a benzophenone ultraviolet ray absorbent, a benzoate ultraviolet ray absorbent and a triazole ultraviolet ray absorbent.

Specific examples of the benzophenone ultraviolet ray absorbent include 2-hydroxy-4-octoxybenzophenone.

Specific examples of the benzoate ultraviolet ray absorbent include 2,4-di-tert-butylphenyl-3,5-di-tert-butyl-4-hydroxybenzoate.

Specific examples of the triazole ultraviolet ray absorbent include 2-(2-hydroxy-5-methylphenyl)benzotriazole, 2-(2-hydroxy-3-(3,4,5,6-tetrahydroxy phthalimide-methyl)-5-methylphenyl)benzotriazole and 2-(3-tert-butyl-2-hydroxy-5-methylphenyl)-5-chlorobenzotriazole.

Examples of the antioxidant include a phenol antioxidant and an organic sulfur antioxidant.

Specific examples of the phenol antioxidant include 3,5-di-tert-butyl-4-hydroxytoluene, 2,2'-methylenebis(6-tert-butyl-4-methylphenol), 4,4'-butylidenebis(6-tert-butyl-3-methylphenol), 2,6-di-tert-butyl-4-(2-octadecyloxy carbonyl) ethylphenol and pentaerythritol tetrakis(3-(3,5-di-tert-butyl-4-hydroxyphenyl)propionate).

Specific examples of the organic sulfur antioxidant include dilauryl-3,3'-thiopropionate, dimyristyl-3,3'-thiopropyonate, disteary-3,3'-thiopropionate, pentaerythritol tetrakis(3-laurylthiopropionate) and 2-mercaptobenzimidazole.

The additives represented by an ultraviolet ray absorbent and an antioxidant can be used in such an amount range that the objects of the addition of the additives are attained, but the objects of the invention are not impaired. For example, in the case where the ultraviolet ray absorbent is added, the addition amount thereof is generally from approximately 100 ppm to approximately 1,000,000 ppm, preferably from approximately 100 ppm to approximately 10,000 ppm, and more preferably from approximately 1,000 ppm to approximately 10,000 ppm, based on the total weight of the liquid crystal compounds. For example, in the case where the antioxidant is added, the addition amount thereof is generally from approximately 10 ppm to approximately 500 ppm, preferably from approximately 30 ppm to approximately 300 ppm, and more preferably from approximately 40 ppm to approximately 200 ppm, based on the total weight of the liquid crystal compounds.

The liquid crystal composition of the invention may contain, in some cases, impurities, such as a synthesis raw material, a by-product, a reaction solvent and a synthesis catalyst, that are mixed therein during the synthesis process of the compounds constituting the liquid crystal composition and the preparation process of the liquid crystal composition.

Production Method of Liquid Crystal Composition

The liquid crystal composition of the invention can be prepared, for example, by mixing and/or shaking the component compounds when the compounds are in a liquid state, or by mixing the compounds, which are then melted by heating, followed by shaking when the compounds contains one in a solid state. The liquid crystal composition of the invention can also be prepared by the other known methods.

Characteristics of the Liquid Crystal Composition

The liquid crystal composition of the invention generally has an optical anisotropy of from approximately 0.080 to approximately 0.120. The liquid crystal composition of the invention can have an optical anisotropy in a range of from approximately 0.050 to approximately 0.180 or in a range of from approximately 0.050 to approximately 0.200, by appropriately controlling the composition and so forth.

The liquid crystal composition of the invention generally has a dielectric anisotropy of from approximately −6.5 to approximately −2.0, and preferably a liquid crystal composition having a dielectric anisotropy of from approximately −5.0 to approximately −2.5 can be obtained. A liquid crystal composition having a dielectric anisotropy in the aforementioned ranges can be preferably applied to liquid crystal display devices having an IPS mode and a VA mode.

In the liquid crystal composition of the invention, such a liquid crystal composition can be generally obtained that has both an optical anisotropy in the aforementioned ranges and a dielectric anisotropy in the aforementioned ranges.

In order to maximize a contrast ratio of a liquid crystal display device driven in an IPS mode or a VA mode, it is designed in such a manner that the product (Δn·d) of the optical anisotropy (Δn) of the liquid crystal composition and the cell gap (d) of the liquid crystal display device is a constant value. In a VA mode, the value (Δn·d) is preferably in a range of from approximately 0.30 μm to approximately 0.35 μm, and in an IPS mode, the value (Δn·d) is preferably in a range of from approximately 0.20 μm to approximately 0.30 μm. The cell gap (d) is generally from approximately 3 μm to approximately 6 μm, and therefore, the optical anisotropy of the liquid crystal composition is preferably in a range of from approximately 0.05 to approximately 0.11 in order to maximize the contrast ratio. In the case where the cell gap (d) is 3 μm or less, the optical anisotropy of the liquid crystal composition preferably exceeds a range of from approximately 0.10 to approximately 0.11.

Liquid Crystal Display Device

The liquid crystal composition of the invention can be applied to a liquid crystal display device. The liquid crystal display device of the invention may be driven in an AM mode or a passive matrix (PM) mode, and may be displayed in any display mode, such as a PC mode, a TN mode, an STN mode, an OCB mode, a VA mode and an WPS mode. The liquid crystal display device driven in an AM mode or a PM mode can be applied to a liquid crystal display of any type, i.e., a reflection type, a transmission type or a semi-transmission type.

The liquid crystal composition of the invention can be applied to a dynamic scattering (DS) mode device using a liquid crystal composition containing an electroconductive agent, a nematic curvilinear aligned phase (NCAP) device prepared by microcapsulating a liquid crystal composition, and a polymer dispersed (PD) device in which a three dimensional net-work polymer is formed in a liquid crystal composition, for example, a polymer network (PN) device.

Owing to the aforementioned characteristics of the liquid crystal composition of the invention, the liquid crystal composition can be preferably applied to an AM mode liquid crystal display device driven in an operation mode utilizing negative dielectric anisotropy, such as a VA mode and an IPS mode, and particularly preferably applied to an AM mode liquid crystal display device driven in a VA mode.

In a liquid crystal display device driven in a TN mode, a VA mode or the like, the direction of the electric field is perpendicular to the liquid crystal layer. In a liquid crystal display device driven in an IPS mode or the like, the direction of the electric field is in parallel to the liquid crystal layer. The structure of the liquid crystal display device driven in a VA mode has been reported in K. Ohmuro, S. Kataoka, T. Sasaki and Y. Koie, SID '97 Digest of Technical Papers, vol. 28, p. 845 (1997), and the structure of the liquid crystal display device driven in an IPS mode has been reported in International Publication 91/10936/1991 (U.S. Pat. No. 5,576,867).

SPECIFIC EXAMPLES

The following examples are for illustrative purposes only and are not intended, nor should they be interpreted to, limit the scope of the invention.

The invention will be explained in detail by way of Examples. The liquid crystal compounds used in the Examples are expressed by the symbols according to the definition in Table 1 below. The steric configuration of 1,4-cyclohexylene in Table 1 is a trans configuration. The ratio (percentage) of the liquid crystal compound is percentage by weight (% by weight) based on the total weight of liquid crystal compounds unless otherwise indicated. The characteristics of the composition are summarized in the last of the Examples.

The numerals attached to the liquid crystal compounds used in the Examples correspond to the formula numbers representing the liquid crystal compounds used as the first, second and third components of the invention, and the case where no formula number is indicated but a symbol "-" is indicated means another liquid crystal compound that does not correspond to the components of the invention.

The method of description of compounds using symbols is shown below in Table 1.

TABLE 1

Description of Compound using Symbols:
R—(A$_1$)—Z$_1$—...—Z$_n$—(A$_n$)—X

| 1) Left Terminal Group R— | Symbol | 3) Bonding Group —Z$_n$— | Symbol |
|---|---|---|---|
| $C_nH_{2n+1}$— | n- | —$C_nH_{2n}$— | n |
| $C_nH_{2n+1}O$— | nO— | —$C_nH_{2n}O$— | 1O |
| $C_nH_{2n+1}OC_mH_{2m}$— | nOm- | —$OCH_2$— | O1 |

TABLE 1-continued

Description of Compound using Symbols:
R—(A₁)—Z₁—...—Zₙ—(Aₙ)—X

| | | | |
|---|---|---|---|
| $CH_2=CH-$<br>$CH_2=CHC_nH_{2n}-$ | V—<br>Vn- | —CH=CH— | V |

| 2) Ring Structure —Aₙ— | Symbol | 4) Right Terminal Group —X | Symbol |
|---|---|---|---|
| 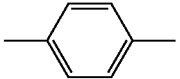 | B | $-C_nH_{2+1}$ | -n |
| 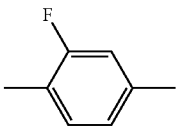 | B(2F) | $-OC_nH_{2n+1}$ | —On |
| 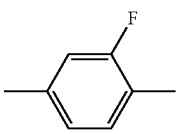 | B(3F) | $-CH=CH_2$ | —V |
| 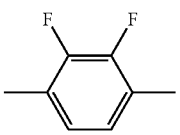 | B(2F,3F) | $-C_nH_{2n}CH=CH_2$ | -nV |
| 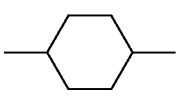 | H | —F | —F |

5) Example of Description

Example 1 3-HB(2F)-3

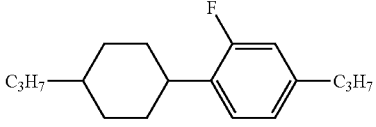

Example 2 3-HB(2F,3F)-O2

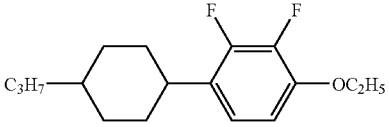

Example 3 3-HB(2F)B(2F,3F)O2

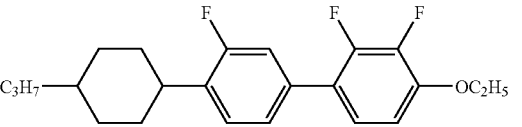

Measurements of the characteristics were carried out according to the following methods. Most methods are described in the Standard of Electric Industries Association of Japan, EIAJ ED-2521 A or those with some modifications.

Maximum Temperature of a Nematic Phase (NI; ° C.)

A sample was placed on a hot plate in a melting point apparatus equipped with a polarizing microscope and was heated at the rate of 1° C. per minute. A temperature was measured when a part of the sample began to change from a nematic phase into an isotropic liquid. A higher limit of a temperature range of a nematic phase may be abbreviated to "a maximum temperature."

Minimum Temperature of a Nematic Phase (Tc; ° C.)

A sample having a nematic phase was kept in a freezer at temperatures of 0° C., −10° C., −20° C., −30° C. and −40° C. for ten days, respectively, and the liquid crystal phase was observed. For example, when the sample remained in a nematic phase at −20° C. and changed to crystals or a smectic phase at −30° C., $T_C$ was expressed as ≦−20° C. A lower limit of a temperature range of a nematic phase may be abbreviated to "a minimum temperature."

Optical Anisotropy (Δn; Measured at 25° C.)

Measurements were carried out with an Abbe refractometer by mounting a polarizing plate on an ocular using a light at a wavelength of 589 nm. The surface of a main prism was rubbed in one direction, and then a sample was dropped on the main prism. The refractive index nil was measured when the direction of the polarized light was parallel to that of the rubbing, and the refractive index n⊥ was measured when the direction of the polarized light was perpendicular to that of the rubbing. A value (Δn) of optical anisotropy was calculated from the equation:

$$\Delta n = n\| - n\bot$$

Viscosity (η; mPa·s, Measured at 20° C.)

The measurement was carried out by using an E-type viscometer.

Dielectric Anisotropy (Δ∈; Measured at 25° C.)

A solution of octadecyltriethoxysilane (0.16 mL) dissolved in ethanol (20 mL) was coated on a glass substrate having been well cleaned. The glass substrate was rotated with a spinner and then heated to 150° C. for 1 hour. A VA device having a distance (cell gap) of 20 μm was fabricated with two sheets of the glass substrates.

A polyimide orientation film was prepared on a glass substrate in the same manner. The orientation film on the glass substrate was subjected to a rubbing treatment, and a TN element having a distance between two sheets of the glass substrates of 9 μm and a twisted angle of 80° was fabricated.

A specimen was charged in the VA device, to which a voltage of 0.5 V (1 kHz, sine wave) was applied, and a dielectric constant (∈∥) in the major axis direction of the liquid crystal molecule was measured.

A specimen was charged in the TN device, to which a voltage of 0.5 V (1 kHz, sine wave) was applied, and a dielectric constant (∈⊥) in the minor axis direction of the liquid crystal molecule was measured.

The dielectric anisotropy Δ∈ was calculated by the equation:

$$\Delta\in = \in\| - \in\bot$$

A composition having the negative value is a composition having a negative dielectric anisotropy.

Voltage Holding Ratio (VHR; Measured at 25° C. and 100° C.; %)

A specimen was charged in a TN device having a polyimide orientation film and having a distance between two glass substrate (cell gap) of 6 μm. A pulse voltage (60 μs at 5 V) was applied to the TN device at 25° C. to charge the device. The waveform of the voltage applied to the TN device was observed with a cathode ray oscilloscope, and an area surrounded by the voltage curve and the abscissa per unit cycle (16.7 ms) was obtained. The area was obtained in the same manner from a waveform obtained after removing the TN device. The value of the voltage holding ratio (%) was calculated by the equation:

Voltage Holding Ratio=(area with TN device)/(area without TN device)×100

The voltage holding ratio thus obtained was designated as VHR-1. Subsequently, the TN device was heated to 100° C. for 250 hours. After cooling the TN device to 25° C., the voltage holding ratio was measured in the same manner. The voltage holding ratio obtained after the heating test was designated as VHR-2. The heating test is an accelerating test and is a test corresponding to a long term durability test of the TN device.

Gas Chromatographic Analysis

Gas Chromatograph Model GC-14B made by Shimadzu Corp. or an equivalent thereof was used as a measuring apparatus. Capillary Column CBP1-M25-025 (length: 25 m, bore: 0.22 mm, film thickness: 0.25 μm, dimethylpolysiloxane as stationary phase, no polarity) made by Shimadzu Corp. was used as a column. Helium was used as a carrier gas, and the flow rate was controlled to 2 mL/minute. The column was maintained at 200° C. for 2 minutes and then further heated to 280° C. at a rate of 5° C. per minute. A specimen evaporating chamber and a detector (FID) were set up at 280° C. and 300° C., respectively.

A specimen was dissolved in acetone to prepare a solution of 0.1% by weight, and 1 μL of the resulting solution was injected into the specimen evaporating chamber.

The recorder used was Chromatopac Model C-R5A made by Shimadzu Corp. or an equivalent thereof. Gas chromatogram obtained showed a retention time of a peak and a peak area corresponding to the component compound.

The solvent for diluting the specimen may also be, for example, chloroform or hexane. The following capillary columns may also be used: DB-1 made by Agilent Technologies Inc. (length: 30 m, bore: 0.32 mm, film thickness: 0.25 elm), HP-1 made by Agilent Technologies Inc. (length: 30 m, bore: 0.32 mm, film thickness: 0.25 μm), Rtx-1 made by Restek Corp. (length: 30 m, bore: 0.32 mm, film thickness: 0.25 μm), and BP-1 made by SGE International Pty. Ltd. (length: 30 m, bore: 0.32 mm, film thickness: 0.25 em). In order to prevent compound peaks from overlapping, a capillary column CBP1-M50-025 (length: 50 m, bore: 0.25 mm, film thickness: 0.25 μm) made by Shimadzu Corp. may be used.

An area ratio of each peak in the gas chromatogram corresponds to the ratio of the component compounds. In general, the percentage by weight of the component compound is not completely identical to the area ratio of each peak. According to the invention, however, the percentage by weight of the component compound may be regarded to be identical to the percentage by area of each peak since the correction coefficient is substantially 1 when these capillary columns are used. This is because there is no significant difference in correction coefficient among the liquid crystal compounds as the component compounds. In order to obtain more precisely the compositional ratio of the liquid crystal compounds in the liquid crystal composition by gas chromatogram, an internal reference method is applied to gas chromatogram. The liquid crystal compound components (components to be measured) having been precisely weighed and a standard liquid crystal compound (standard substance) are simultaneously measured by gas chromatography, and the relative intensity of the area ratio of peaks of the components to be measured and a peak of the standard substance is calculated in advance. The compositional ratio of the liquid crystal compounds in the liquid crystal composition can be precisely obtained by gas chromatography analysis by correcting using the relative intensity of the peak areas of the components with respect to the standard substance.

Comparative Example 1

The following composition containing the second component and the third component of the invention was prepared, and the characteristic values thereof were measured by the aforementioned methods.

| 3-HB(2F,3F)-O2  | (2-1-1-1) | 14% |
| 5-HB(2F,3F)-O2  | (2-1-1-1) | 14% |
| 3-HHB(2F,3F)-O2 | (2-2-1-1) | 11% |
| 5-HHB(2F,3F)-O2 | (2-2-1-1) | 11% |
| 2-HHB(2F,3F)-1  | (2-2-1-1) | 10% |
| 3-HHB(2F,3F)-1  | (2-2-1-1) | 10% |
| 3-HH-4          | (3-1-1)   | 7%  |
| 3-HH-5          | (3-1-1)   | 7%  |
| 3-HB-O1         | (3-1-2)   | 8%  |
| 5-HB-3          | (3-1-2)   | 8%  |

NI=68.9° C.; $T_C \leq -10°$ C.; Δn=0.081; Δ∈=−3.3; VHR-1=99.3%

Example 1

The following composition was prepared, and the characteristic values thereof were measured by the aforementioned methods.

| 3-HB(2F)-O2     | (1-1-1-1) | 8%  |
| 3-HB(3F)-O2     | (1-1-1-2) | 8%  |
| 3-HHB(2F)-O2    | (1-2-1-1) | 7%  |
| 3-HHB(3F)-O2    | (1-2-1-2) | 7%  |
| 3-HB(2F,3F)-O2  | (2-1-1-1) | 14% |
| 5-HB(2F,3F)-O2  | (2-1-1-1) | 14% |
| 3-HHB(2F,3F)-O2 | (2-2-1-1) | 11% |
| 5-HHB(2F,3F)-O2 | (2-2-1-1) | 11% |
| 2-HHB(2F,3F)-1  | (2-2-1-1) | 10% |
| 3-HHB(2F,3F)-1  | (2-2-1-1) | 10% |

NI=84.3° C.; $T_C \leq -10°$ C.; Δn=0.096; Δ∈=−4.3; η=38.8 mPa·s; VHR-1=99.3%

The non-halogen-replaced liquid crystal compound as the third component in the composition of Comparative Example 1 was replaced by a mono-fluorine-replaced liquid crystal compound as the first component. As compared to Comparative Example 1, the composition of Example 1 had a high maximum temperature, a negatively large Δ∈ and a large voltage holding ratio, while the minimum temperature was equivalent. The temperature range of a nematic phase could be enhanced, and Δ∈ could be negatively large, owing to the combination of the first component and the second component.

Example 2

The following composition was prepared, and the characteristic values thereof were measured by the aforementioned methods.

| 3-HB(2F)-3    | (1-1-1-1) | 8% |
| 3-HB(2F)-O2   | (1-1-1-1) | 8% |
| 3-HHB(2F)-O2  | (1-2-1-1) | 6% |

-continued

| | | |
|---|---|---|
| 3-HHB(2F)-1 | (1-2-1-1) | 6% |
| 3-HHB(3F)-O2 | (1-2-1-2) | 7% |
| 3-HHB(3F)-1 | (1-2-1-2) | 8% |
| 3-H1OB(2F)-O2 | (1-1-2-1) | 6% |
| 3-H1OB(3F)-3 | (1-1-2-2) | 6% |
| 3-H1OB(3F)-O2 | (1-1-2-2) | 6% |
| 3-H1OB(2F)H-3 | (1-3-1) | 7% |
| 3-H1OB(2F)H-O2 | (1-3-1) | 7% |
| 3-HB(2F,3F)-O2 | (2-1-1-1) | 5% |
| 3-HB(2F,3F)-O4 | (2-1-1-1) | 5% |
| 5O-HHB(2F,3F)-1 | (2-2-1-1) | 5% |
| 3-HB(2F)B(2F,3F)-O2 | (2-2-1-3) | 5% |
| 3-HB(3F)B(2F,3F)-O2 | (2-2-1-4) | 5% |

NI=71.2° C.; $T_C \leqq -20°$ C.; $\Delta n$=0.087; $\Delta \in$=−3.3; $\eta$=28.4 mPa·s As compared to Comparative Example 1, the composition of Example 2 had a high maximum temperature and a low minimum temperature of $\leqq -20°$ C. to enhance the temperature range of a nematic phase.

Example 3

The following composition was prepared, and the characteristic values thereof were measured by the aforementioned methods.

| | | |
|---|---|---|
| 3-HB(3F)-3 | (1-1-1-2) | 10% |
| 3-HB(3F)-O2 | (1-1-1-2) | 10% |
| 3-H1OB(2F)H-3 | (1-3-1) | 7% |
| 3-H1OB(2F)H-O2 | (1-3-1) | 8% |
| 3-H1OB(2F)B-3 | (1-3-1) | 8% |
| 3-H1OB(2F)B-O2 | (1-3-1) | 7% |
| 3-HH1OB(2F)-O2 | (1-2-3-1) | 5% |
| 3-HH1OB(2F)-1 | (1-2-3-1) | 5% |
| 5-HB(2F,3F)-O2 | (2-1-1-1) | 5% |
| 5-HB(2F,3F)-O4 | (2-1-1-1) | 5% |
| 3-HHB(2F,3F)-1 | (2-2-1-1) | 5% |
| 3-HHB(2F,3F)-2 | (2-2-1-1) | 5% |
| 3-HHB(2F,3F)-O2 | (2-2-1-1) | 7% |
| 5-HHB(2F,3F)-O2 | (2-2-1-1) | 8% |
| 5-HBB(2F,3F)-O2 | (2-2-1-2) | 5% |

NI=98.1° C.; $T_C \leqq -20°$ C.; $\Delta n$=0.108; $\Delta \in$=−3.4; $\eta$=32.5 mPa·s As compared to Comparative Example 1, the composition of Example 3 had a high maximum temperature and a low minimum temperature of $\leqq -20°$ C. to enhance the temperature range of a nematic phase.

Example 4

The following composition was prepared, and the characteristic values thereof were measured by the aforementioned methods.

| | | |
|---|---|---|
| 3-HHB(2F)-O2 | (1-2-1-1) | 5% |
| 3-HB(3F)-1 | (1-2-1-2) | 5% |
| 3-HHB(3F)-O2 | (1-2-1-2) | 5% |
| 3-HH1OB(2F)-1 | (1-2-3-1) | 7% |
| 3-HH1OB(2F)-O2 | (1-2-3-1) | 7% |
| 2O-HHB(2F,3F)-1 | (2-2-1-1) | 7% |
| 3-HHB(2F,3F)-O2 | (2-2-1-1) | 7% |
| 5-HHB(2F,3F)-O2 | (2-2-1-1) | 6% |
| 5O-HHB(2F,3F)-1 | (2-2-1-1) | 7% |
| 3-HBB(2F,3F)-O2 | (2-2-1-2) | 8% |
| 5-HBB(2F,3F)-O2 | (2-2-1-2) | 8% |
| 3-HB-O2 | (3-1-2) | 7% |
| 5-HB-O2 | (3-1-2) | 7% |
| 5-HB-3 | (3-1-2) | 7% |
| 7-HB-1 | (3-1-2) | 7% |

NI=102.8° C.; $T_C \leqq -20°$ C.; $\Delta n$=0.098; $\Delta \in$=−3.1; $\eta$=27.7 mPa·s; VHR-1=99.2%

As compared to Comparative Example 1, the composition of Example 4 had a high maximum temperature and a low minimum temperature of $\leqq -20°$ C. to enhance the temperature range of a nematic phase. The composition had a large voltage holding ratio.

Example 5

The following composition was prepared, and the characteristic values thereof were measured by the aforementioned methods.

| | | |
|---|---|---|
| 3-HB(2F)-O2 | (1-1-1-1) | 7% |
| 3-HHB(3F)-1 | (1-2-1-2) | 6% |
| 3-H1OB(3F)-3 | (1-1-2-2) | 7% |
| 3-H1OB(3F)-O2 | (1-1-2-2) | 6% |
| 3-H1OB(2F)H-3 | (1-3-1) | 6% |
| 3-H1OB(2F)B-3 | (1-3-1) | 5% |
| 3-H1OB(2F)B-O2 | (1-3-1) | 5% |
| 3-HH1OB(2F)-O2 | (1-2-3-1) | 5% |
| 3-HH1OB(2F)-1 | (1-2-3-1) | 5% |
| 3-HHB(2F,3F)-O1 | (2-2-1-1) | 5% |
| 3-HHB(2F,3F)-O2 | (2-2-1-1) | 7% |
| 5-HHB(2F,3F)-O2 | (2-2-1-1) | 8% |
| 5-HBB(2F,3F)-O2 | (2-2-1-2) | 8% |
| 3-HH-4 | (3-1-1) | 7% |
| 3-HB-O2 | (3-1-2) | 6% |
| 5-HB-3 | (3-1-2) | 7% |

NI=90.5° C.; $T_C \leqq -20°$ C.; $\Delta n$=0.098; $\Delta \in$=−2.7; $\eta$=27.7 mPa·s As compared to Comparative Example 1, the composition of Example 5 had a high maximum temperature and a low minimum temperature of $\leqq -20°$ C. to enhance the temperature range of a nematic phase.

Example 6

The following composition was prepared, and the characteristic values thereof were measured by the aforementioned methods.

| | | |
|---|---|---|
| 3-HB(3F)-3 | (1-1-1-2) | 8% |
| 3-HB(3F)-O2 | (1-1-1-2) | 8% |
| 3-HHB(3F)-O2 | (1-2-1-2) | 5% |
| 3-HHB(3F)-1 | (1-2-1-2) | 5% |
| 3-H1OB(2F)-3 | (1-1-2-1) | 7% |
| 3-H1OB(2F)H-3 | (1-3-1) | 7% |
| 3-H1OB(2F)H-O2 | (1-3-1) | 7% |
| 3-HH1OB(2F)-O2 | (1-2-3-1) | 5% |
| 3-HH1OB(2F)-1 | (1-2-3-1) | 5% |
| 3-HB1OB(2F)-O2 | (1-2-3) | 5% |
| 3-HB(2F,3F)-O2 | (2-1-1-1) | 8% |
| 3-HB(2F,3F)-O4 | (2-1-1-1) | 8% |
| 3-HB(2F)B(2F,3F)-O2 | (2-2-1-3) | 7% |
| 3-HB(3F)B(2F,3F)-O2 | (2-2-1-4) | 7% |
| 1O1-HBBH-3 | (3-3-1) | 5% |
| 1O1-HBBH-5 | (3-3-1) | 3% |

NI=85.3° C.; $T_C \leqq -200$ C; $\Delta n$=0.100; $\Delta \in$=−3.5; $\eta$=32.4 mPa·s As compared to Comparative Example 1, the composition of Example 6 had a high maximum temperature and a low minimum temperature of ≦−20° C. to enhance the temperature range of a nematic phase.

Example 7

The following composition was prepared, and the characteristic values thereof were measured by the aforementioned methods.

| | | |
|---|---|---|
| 3-HB(2F)-O2 | (1-1-1-1) | 5% |
| 3-HHB(3F)-O2 | (1-2-1-2) | 3% |
| 3-HBB(3F)-O2 | (1-2-2-1) | 5% |
| 3-H1OB(3F)-3 | (1-1-2-2) | 6% |
| 3-H1OB(2F)H-O2 | (1-3-1) | 5% |
| 3-H1OB(2F)B-O2 | (1-3-1) | 6% |
| 3-HB1OB(2F)-O2 | (1-2-3) | 5% |
| 3-HB1OB(2F)-1 | (1-2-3) | 5% |
| 3-HB(2F,3F)-O2 | (2-1-1-1) | 5% |
| 3-HB(2F,3F)-O4 | (2-1-1-1) | 6% |
| 2O-HHB(2F,3F)-1 | (2-2-1-1) | 3% |
| 3-HBB(2F,3F)-O2 | (2-2-1-2) | 7% |
| 5-HBB(2F,3F)-O2 | (2-2-1-2) | 7% |
| 3-HB(3F)B(2F,3F)-O2 | (2-2-1-4) | 7% |
| 3-HH-4 | (3-1-1) | 8% |
| 5-HB-3 | (3-1-2) | 7% |
| 3-HHB-3 | (3-2-1) | 5% |
| 3-HHB-O1 | (3-2-1) | 5% |

NI=91.0° C.; $T_C$≦−20° C.; Δn=0.108; Δ∈=−3.4; η=28.1 mPa·s

As compared to Comparative Example 1, the composition of Example 7 had a high maximum temperature and a low minimum temperature of ≦−20° C. to enhance the temperature range of a nematic phase.

Example 8

The following composition was prepared, and the characteristic values thereof were measured by the aforementioned methods.

| | | |
|---|---|---|
| 3-HB(2F)-3 | (1-1-1-1) | 10% |
| 3-HB(2F)-O2 | (1-1-1-1) | 10% |
| 3-HHB(2F)-O2 | (1-2-1-1) | 7% |
| 3-HB(2F,3F)-O2 | (2-1-1-1) | 10% |
| 3-HB(2F,3F)-O4 | (2-1-1-1) | 10% |
| 3-HB(2F)B(2F,3F)-O2 | (2-2-1-3) | 8% |
| 3-HB(3F)B(2F,3F)-O2 | (2-2-1-4) | 7% |
| 3-HB(2F,3F)B(2F,3F)-O2 | (2-2-1-5) | 7% |
| 3-HB-O2 | (3-1-2) | 8% |
| 5-HB-O2 | (3-1-2) | 8% |
| 5-HBB(3F)B-2 | (3-3-2) | 5% |
| 5-HBB(3F)B-O2 | (3-3-2) | 5% |
| 5-HBB(3F)B-3 | (3-3-2) | 5% |

NI=80.3° C.; $T_C$≦−20° C.; Δn=0.116; Δ∈=−4.3; η=34.1 mPa·s

As compared to Comparative Example 1, the composition of Example 8 had a high maximum temperature and a low minimum temperature of ≦−20° C., and had a negatively large Δ∈.

Example 9

The following composition was prepared, and the characteristic values thereof were measured by the aforementioned methods.

| | | |
|---|---|---|
| 3-HB1OB(2F)-O2 | (1-2-3) | 6% |
| 3-HB1OB(2F)-1 | (1-2-3) | 6% |
| 3-HB(2F,3F)-O2 | (2-1-1-1) | 11% |
| 3-HB(2F,3F)-O4 | (2-1-1-1) | 10% |
| 5-HB(2F,3F)-O2 | (2-1-1-1) | 10% |
| 5-HB(2F,3F)-O4 | (2-1-1-1) | 9% |
| 3-HB(2F)B(2F,3F)-O2 | (2-2-1-3) | 7% |
| 3-HB(3F)B(2F,3F)-O2 | (2-2-1-4) | 7% |
| 3-HB(2F,3F)B(2F,3F)-O2 | (2-2-1-5) | 6% |
| V-HHB-1 | (3-2-1) | 8% |
| V2-HHB-1 | (3-2-1) | 8% |
| 1O1-HBBH-4 | (3-3-1) | 5% |
| 1O1-HBBH-5 | (3-3-1) | 4% |
| 5-HBB(3F)B-2 | (3-3-2) | 3% |

NI=91.8° C.; $T_C$≦−20° C.; Δn=0.110; Δ∈=−4.1; η=36.7 mPa·s

As compared to Comparative Example 1, the composition of Example 9 had a high maximum temperature and a low minimum temperature of ≦−20° C., and had a negatively large Δ∈.

Example 10

The following composition was prepared, and the characteristic values thereof were measured by the aforementioned methods.

| | | |
|---|---|---|
| 3-HB(3F)-3 | (1-1-1-2) | 10% |
| 3-HB(3F)-O2 | (1-1-1-2) | 8% |
| 3-HHB(2F)-1 | (1-2-1-1) | 5% |
| 3-HHB(3F)-O2 | (1-2-1-2) | 5% |
| 3-HHB(3F)-1 | (1-2-1-2) | 5% |
| 3-HB(2F,3F)-O2 | (2-1-1-1) | 5% |
| 3-HB(2F,3F)-O4 | (2-1-1-1) | 5% |
| 3-HHB(2F,3F)-O2 | (2-2-1-1) | 5% |
| 5-HHB(2F,3F)-O2 | (2-2-1-1) | 3% |
| 3-HB(2F)B(2F,3F)-O2 | (2-2-1-3) | 8% |
| 3-HB(3F)B(2F,3F)-O2 | (2-2-1-4) | 8% |
| 2-HH-5 | (3-1-1) | 5% |
| 3-HH-4 | (3-1-1) | 12% |
| 3-HHB-3 | (3-2-1) | 5% |
| 3-HHB-O1 | (3-2-1) | 3% |
| 5-HBB(3F)B-2 | (3-3-2) | 3% |
| 5-HBB(3F)B-O2 | (3-3-2) | 5% |

NI=94.3° C.; $T_C$≦−20° C.; Δn=0.096; Δ∈=−3.4; η=31.5 mPa·s

As compared to Comparative Example 1, the composition of Example 10 had a high maximum temperature and a low minimum temperature of ≦−20° C. to enhance the temperature range of a nematic phase.

Example 11

The following composition was prepared, and the characteristic values thereof were measured by the aforementioned methods.

| | | |
|---|---|---|
| 3-HB(2F)-O2 | (1-1-1-1) | 13% |
| 3-HB(3F)-O2 | (1-1-1-2) | 13% |
| 3-HHB(2F)-O2 | (1-2-1-1) | 7% |
| 5-HHB(2F)-O2 | (1-2-1-1) | 7% |
| 3-HHB(3F)-O2 | (1-2-1-2) | 7% |
| 5-HHB(3F)-O2 | (1-2-1-2) | 7% |
| 3-HB(2F,3F)-O2 | (2-1-1-1) | 13% |

-continued

| | | |
|---|---|---|
| 5-HB(2F,3F)-O2 | (2-1-1-1) | 13% |
| 3-HHB(2F,3F)-O2 | (2-2-1-1) | 4% |
| 2-HHB(2F,3F)-1 | (2-2-1-1) | 8% |
| 3-HHB(2F,3F)-1 | (2-2-1-1) | 8% |

NI=71.2° C.; $T_C \leq -20°$ C.; $\Delta n=0.091$; $\Delta \epsilon=-3.1$; $\eta=23.0$ mPa·s As compared to Comparative Example 1, the composition of Example 11 had a high maximum temperature and a low minimum temperature of $\leq -20°$ C. to enhance the temperature range of a nematic phase.

Example 12

The following composition was prepared, and the characteristic values thereof were measured by the aforementioned methods.

| | | |
|---|---|---|
| 3-HB(2F)-O2 | (1-1-1-1) | 5% |
| 5-HB(3F)-O1 | (1-1-1-2) | 5% |
| 3-HHB(3F)-O2 | (1-2-1-2) | 4% |
| 3-HBB(3F)-O2 | (1-2-2-1) | 4% |
| 3-H1OB(3F)-3 | (1-1-2-2) | 7% |
| 3-H1OB(2F)H-O2 | (1-3-1) | 5% |
| 3-H1OB(2F)B-O2 | (1-3-1) | 5% |
| 3-HB1OB(2F)-1 | (1-2-3) | 5% |
| 3-HB(2F,3F)-O2 | (2-1-1-1) | 5% |
| 3-HB(2F,3F)-O4 | (2-1-1-1) | 6% |
| 3-HBB(2F,3F)-O2 | (2-2-1-2) | 7% |
| 5-HBB(2F,3F)-O2 | (2-2-1-2) | 7% |
| 3-HH-4 | (3-1-1) | 9% |
| 3-HB-5 | (3-1-2) | 6% |
| 3-HHB-3 | (3-2-1) | 6% |
| 3-HHB-O1 | (3-2-1) | 4% |
| 5-HHB(3F)-F | (—) | 5% |
| 4-HBB(3F)-F | (—) | 5% |

NI=84.7° C.; $T_C \leq -20°$ C.; $\Delta n=0.101$; $\Delta \epsilon=-2.4$; $\eta=29.3$ mPa·s As compared to Comparative Example 1, the composition of Example 12 had a high maximum temperature and a low minimum temperature of $\leq -20°$ C. to enhance the temperature range of a nematic phase.

Example 13

140 ppm of 3,5-di-tert-butyl-4-hydroxytoluene as an antioxidant was added to the composition of Example 4, and the composition had the following characteristic values.

NI=102.8° C.; $T_C \leq -20°$ C.; $\Delta n=0.098$; $\Delta \epsilon=-3.1$; $\eta=27.7$ mPa·s; VHR-1=99.2%

Although the invention has been described and illustrated with a certain degree of particularity, it is understood that the present disclosure has been made only by way of example, and that numerous changes in the conditions and order of steps can be resorted to by those skilled in the art without departing from the spirit and scope of the invention.

What is claimed is:

1. A liquid crystal composition having a negative dielectric anisotropy and comprising a first component comprising at least one compound selected from the group of compounds represented by formulas (1-1) to (1-3) and a second component comprising at least one compound selected from the group of compounds represented by formulas (2-1) to (2-3):

(1-1)

(1-2)

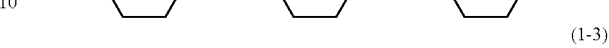
(1-3)

(2-1)

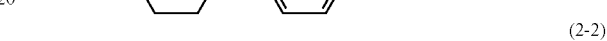
(2-2)

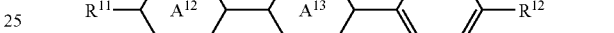
(2-3)

wherein, in formulas (1-1) to (1-3) and formulas (2-1) to (2-3), $R^{11}$ and $R^{12}$ are independently alkyl, alkenyl or alkoxy;

ring $A^{11}$ is independently 2-fluoro-1,4-phenylene or 3-fluoro-1,4-phenylene; ring $A^{12}$ is independently 1,4-cyclohexylene or 1,4-phenylene; ring $A^{13}$ is independently 1,4-cyclohexylene or 1,4-phenylene, arbitrary hydrogen of which may be replaced by fluorine or chlorine; and $Z^{11}$ and $Z^{12}$ are independently a single bond, —$C_2H_4$—, —$CH_2O$— or —$OCH_2$—, provided that a compound represented by formula (1-2), wherein ring $A^{11}$ is 2-fluoro-1,4-phenylene, ring $A^{12}$ is 1,4-phenylene, and $Z^{11}$ and $Z^{12}$ are single bonds, and a compound represented by formula (1-3), wherein ring $A^{11}$ is 3-fluoro-1,4-phenylene, ring $A^{12}$ is 1,4-phenylene, and $Z^{11}$ and $Z^{12}$ are single bonds, are excluded.

2. A liquid crystal composition having a negative dielectric anisotropy and comprising a first component comprising at least one compound selected from the group of compounds represented by formulas (1-1-1), (1-1-2), (1-2-1), (1-2-2), (1-2-3) and (1-3-1) and a second component comprising at least one compound selected from the group of compounds represented by formulas (2-1-1), (2-2-1) and (2-3-1):

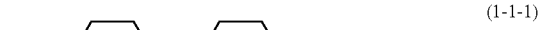
(1-1-1)

-continued

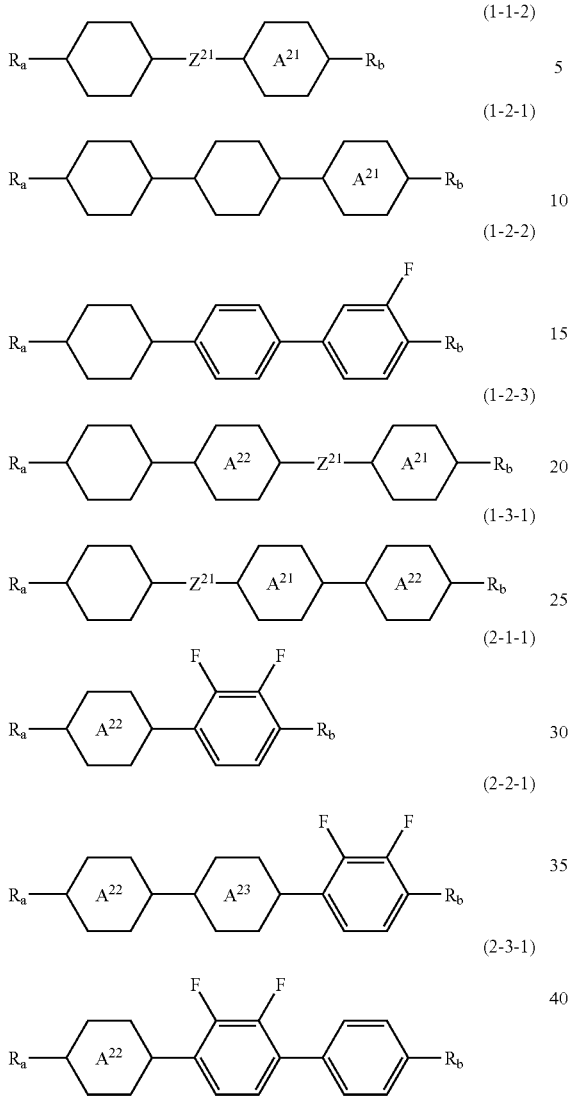

wherein in formulas (1-1-1), (1-1-2), (1-2-1), (1-2-2), (1-2-3), (1-3-1), (2-1-1), (2-2-1) and (2-3-1), $R_a$ is independently alkyl or alkenyl; $R_b$ is independently alkyl, alkenyl or alkoxy;

ring $A^{21}$ is independently 2-fluoro-1,4-phenylene or 3-fluoro-1,4-phenylene; ring $A^{22}$ is independently 1,4-cyclohexylene or 1,4-phenylene; ring $A^{23}$ is 1,4-cyclohexylene or 1,4-phenylene, arbitrary hydrogen of which may be replaced by fluorine; and $Z^{21}$ is —CH$_2$O— or —OCH$_2$—.

3. The liquid crystal composition according to claim 2, wherein the liquid crystal composition comprises the first component comprising at least one compound selected from a group of compounds represented by formulas (1-1-1), (1-1-2), (1-2-1), (1-2-2) and (1-2-3) and the second component comprising at least one compound selected from the group of compounds represented by formulas (2-1-1), (2-2-1) and (2-3-1).

4. The liquid crystal composition according to claim 1, wherein the a content ratio of the first component is from approximately 10% to approximately 80% by weight, and a content ratio of the second component is from approximately 20% to approximately 90% by weight, based on the total weight of the liquid crystal compounds.

5. A liquid crystal composition having a negative dielectric anisotropy and comprising a first component comprising at least one compound selected from the group of compounds represented by formulas (1-1) to (1-3), a second component comprising at least one compound selected from the group of compounds represented by formulas (2-1) to (2-3), and a third component comprising at least one compound selected from the group of compounds represented by formulas (3-1) to (3-3):

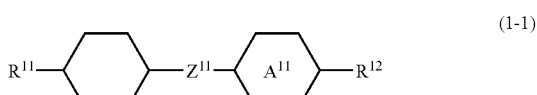

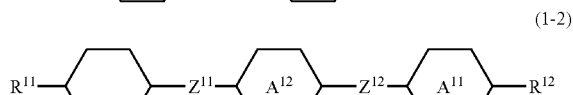

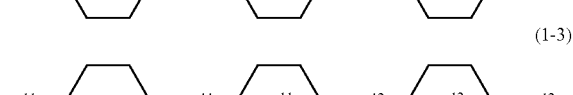

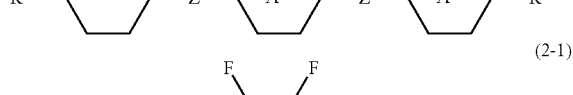

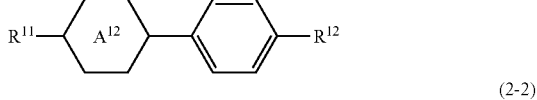

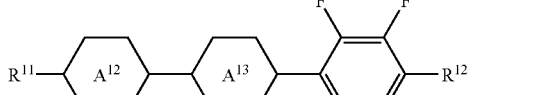

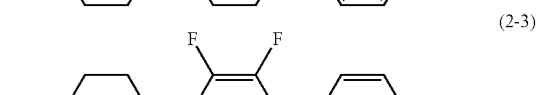

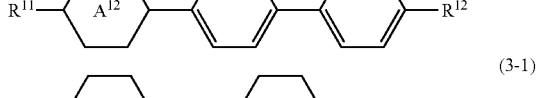

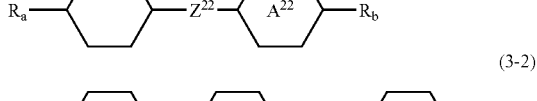

wherein, in formulas (1-1) to (1-3) and formulas (2-1) to (2-3), $R^{11}$ and $R^{12}$ are independently alkyl, alkenyl or alkoxy;

ring $A^{11}$ is independently 2-fluoro-1,4-phenylene or 3-fluoro-1,4-phenylene; ring $A^{12}$ is independently 1,4-cyclohexylene or 1,4-phenylene; ring $A^{13}$ is independently 1,4-cyclohexylene or 1,4-phenylene, arbitrary hydrogen of which may be replaced by fluorine or chlorine; and $Z^{11}$ and $Z^{12}$ are independently a single bond, —$C_2H_4$—, —$CH_2O$— or —$OCH_2$—, wherein in formulas (3-1) to (3-3), $R_a$ is independently alkyl or alkenyl; $R_b$ is independently alkyl, alkenyl or alkoxy; $R_c$ is alkyl, alkenyl, alkoxy or alkoxymethyl;

plural rings $A^{22}$ are independently 1,4-cyclohexylene or 1,4-phenylene; and ring $A^{23}$ is independently 1,4-cyclohexylene or 1,4-phenylene, arbitrary hydrogen of which may be replaced by fluorine; and $Z^{22}$ represents a single bond, —$CH_2O$—, —$OCH_2$— or —COO—, provided that a compounds represented by formula (1-2), wherein ring $A^{11}$ is 2-fluoro-1,4-phenylene, ring $A^{12}$ is 1,4-phenylene, and $Z^{11}$ and $Z^{12}$ are single bonds, and a compound represented by formula (1-3), wherein ring $A^{11}$ is 3-fluoro-1,4-phenylene, ring $A^{12}$ is 1,4-phenylene, and $Z^{11}$ and $Z^{12}$ are single bonds, are excluded.

6. The liquid crystal composition according to claim 5, wherein a content ratio of the first component is from approximately 5% to approximately 75% by weight, a content ratio of the second component is from approximately 20% to approximately 80% by weight, and a content ratio of the third component is from approximately 5% to approximately 45% by weight, based on the total weight of the liquid crystal compounds.

7. A liquid crystal composition having a negative dielectric anisotropy and comprising a first component comprising at least one compound selected from the group of compounds represented by formulas (1-1-1-1), (1-1-1-2), (1-1-2-1), (1-1-2-2), (1-2-1-1), (1-2-1-2), (1-2-2-1), (1-2-3-1) and (1-2-3-2) and a second component comprising at least one compound selected from the group of compounds represented by formulas (2-1-1-1), (2-2-1-1), (2-2-1-2), (2-2-1-3), (2-2-1-4) and (2-2-1-5):

(1-1-1-1)

(1-1-1-2)

(1-1-2-1)

(1-1-2-2)

(1-2-1-1)

(1-2-1-2)

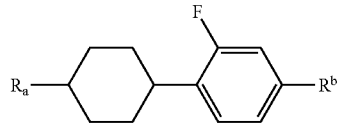

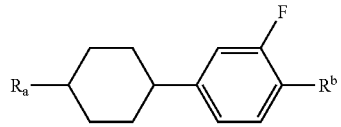

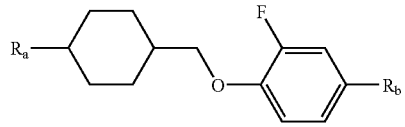

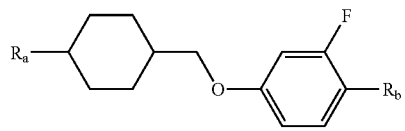

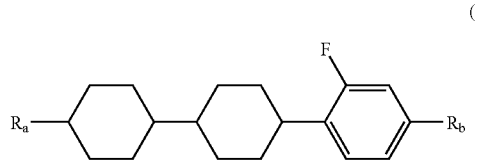

-continued (1-2-1-2)

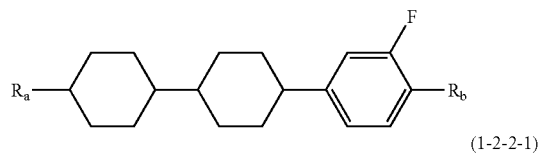

(1-2-2-1)

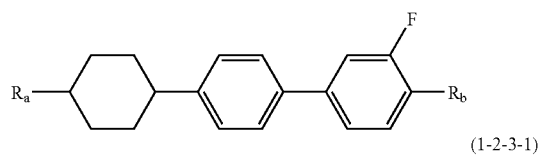

(1-2-3-1)

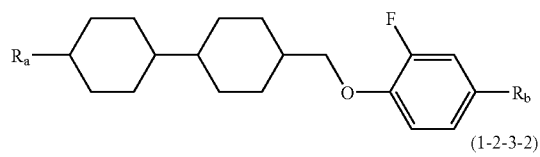

(1-2-3-2)

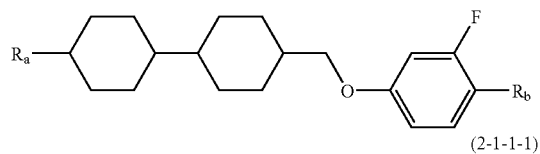

(2-1-1-1)

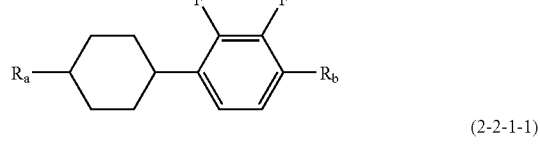

(2-2-1-1)

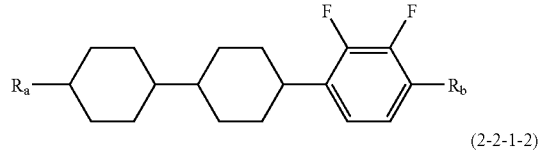

(2-2-1-2)

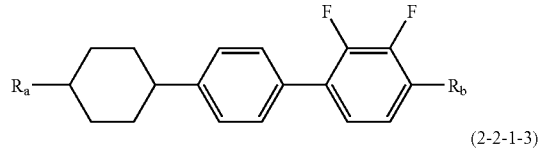

(2-2-1-3)

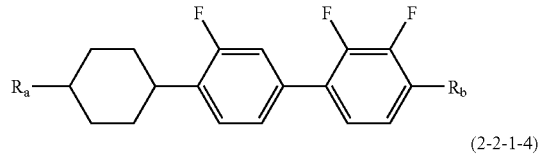

(2-2-1-4)

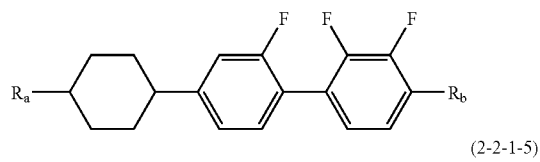

(2-2-1-5)

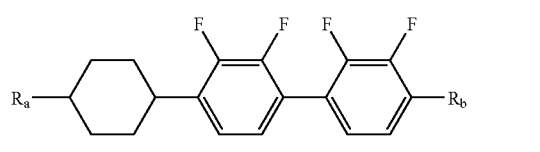

wherein in formulas (1-1-1-1), (1-1-1-2), (1-1-2-1), (1-1-2-2), (1-2-1-1), (1-2-1-2), (1-2-2-1), (1-2-3-1), (1-2-3-2), (2-1-

1-1), (2-2-1-1), (2-2-1-2), (2-2-1-3), (2-2-1-4) and (2-2-1-5), $R_a$ is independently alkyl or alkenyl; and $R_b$ is independently alkyl, alkenyl or alkoxy.

8. The liquid crystal composition according to claim 7, wherein the liquid crystal composition comprises the first component comprising at least one compound selected from a group of compounds represented by formulas (1-1-1-1), (1-1-2-1), (1-2-1-1) and (1-2-3-1) and the second component comprising at least one compound selected from the group of compounds represented by formulas (2-1-1-1) and (2-2-1-1) to (2-2-1-5).

9. The liquid crystal composition according to claim 7, wherein the liquid crystal composition comprises the first component comprising at least one compound selected from a group of compounds represented by formulas (1-1-1-1), (1-1-1-2), (1-2-1-1), (1-2-1-2) and (1-2-2-1) and the second component comprising at least one compound selected from the group of compounds represented by formulas (2-1-1-1) and (2-2-1-1) to (2-2-1-5).

10. The liquid crystal composition according to claim 7, wherein the liquid crystal composition comprises the first component comprising at least one compound selected from a group of compounds represented by formulas (1-1-1-1), (1-1-2-1), (1-2-1-1) and (1-2-3-1) and the second component comprising at least one compound selected from a group of compounds represented by formulas (2-1-1-1), (2-2-1-1) and (2-2-1-2).

11. The liquid crystal composition according to claim 7, wherein the liquid crystal composition comprises the first component comprising at least one compound selected from a group of compounds represented by formulas (1-1-2-1), (1-1-2-2), (1-2-3-1) and (1-2-3-2) and the second component comprising at least one compound selected from a group of compounds represented by formulas (2-1-1-1), (2-2-1-1) and (2-2-1-2).

12. The liquid crystal composition according to claim 7, wherein the liquid crystal composition comprises the first component comprising at least one compound selected from a group of compounds represented by formulas (1-1-2-1) and (1-2-3-1) and the second component comprising at least one compound selected from the group of compounds represented by formulas (2-1-1-1), (2-2-1-1) and (2-2-1-2).

13. The liquid crystal composition according to claim 7, wherein a content ratio of the first component is from approximately 30% to approximately 75% by weight, and a content ratio of the second component is from approximately 25% to approximately 70% by weight, based on the total weight of the liquid crystal compounds.

14. A liquid crystal composition having a negative dielectric anisotropy and comprising a first component comprising at least one compound selected from the group of compounds represented by formulas (1-1-1-1), (1-1-1-2), (1-2-1-1), (1-1-2-2), (1-2-1-1), (1-2-1-2), (1-2-2-1), (1-2-3-1) and (1-2-3-2), a second component comprising at least one compound selected from the group of compounds represented by formulas (2-1-1-1), (2-2-1-1), (2-2-1-2), (2-2-1-3), (2-2-1-4) and (2-2-1-5), and a third component comprising at least one compound selected from the group of compounds represented by formulas (3-1-1), (3-1-2), (3-2-1), (3-3-1) and (3-3-2):

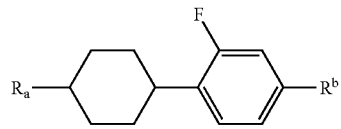 (1-1-1-1)

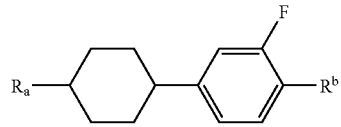 (1-1-1-2)

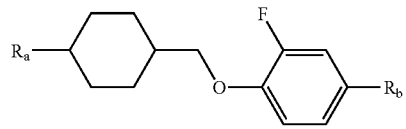 (1-1-2-1)

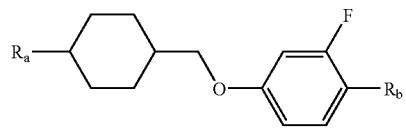 (1-1-2-2)

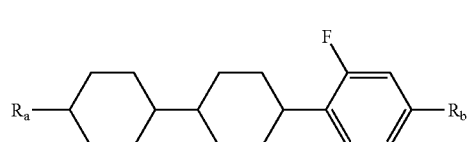 (1-2-1-1)

 (1-2-1-2)

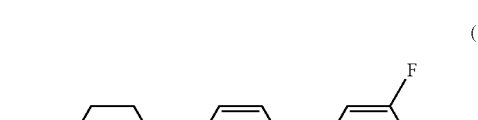 (1-2-2-1)

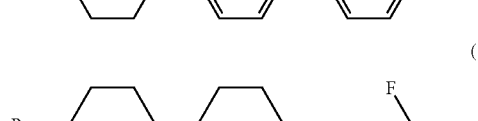 (1-2-3-1)

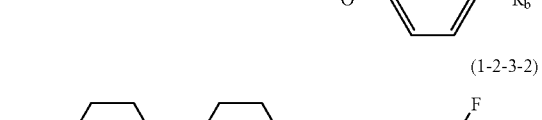 (1-2-3-2)

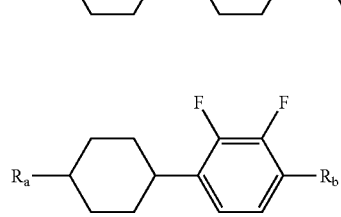 (2-1-1-1)

-continued

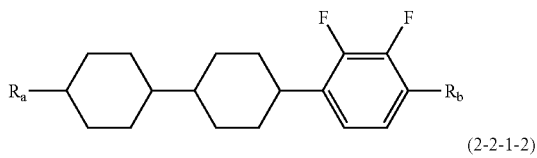 (2-2-1-1)

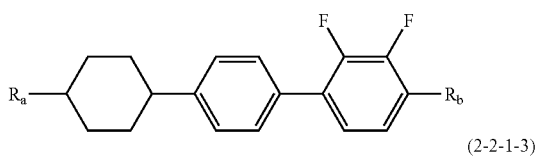 (2-2-1-2)

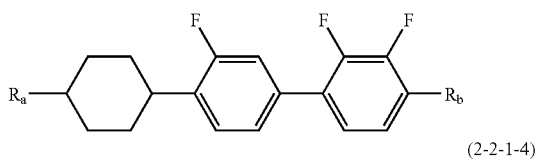 (2-2-1-3)

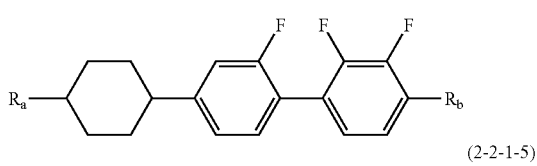 (2-2-1-4)

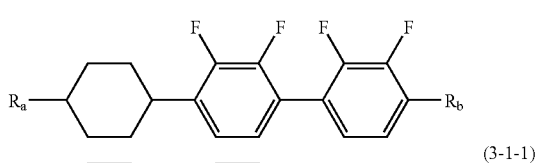 (2-2-1-5)

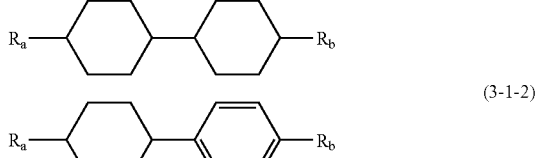 (3-1-1)

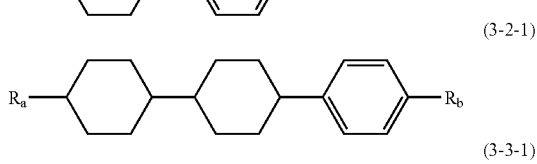 (3-1-2)

(3-2-1)

(3-3-1)

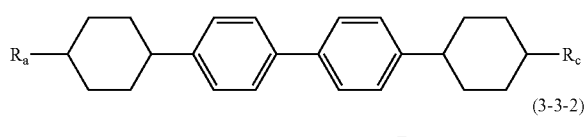 (3-3-2)

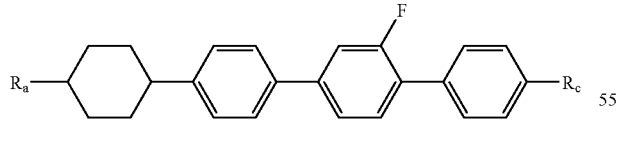

wherein in formulas (1-1-1-1), (1-1-1-2), (1-1-2-1), (1-1-2-2), (1-2-1-1), (1-2-1-2), (1-2-2-1), (1-2-3-1), (1-2-3-2), (2-1-1-1), (2-2-1-1), (2-2-1-2), (2-2-1-3), (2-2-1-4) and (2-2-1-5), (3-1-1), (3-1-2), (3-2-1), (3-3-1) and (3-3-2), $R_a$ is independently alkyl or alkenyl; $R_b$ is independently alkyl, alkenyl or alkoxy; and $R_c$ is independently alkyl, alkenyl, alkoxy or alkoxymethyl.

15. The liquid crystal composition according to claim 14, wherein the third component comprises at least one compound selected from a group of compounds represented by formulas (3-1-1), (3-1-2) and (3-2-1).

16. The liquid crystal composition according to claim 14, wherein the third component comprises at least one compound selected from a group of compounds represented by formula (3-2-1).

17. The liquid crystal composition according to claim 14, wherein a content ratio of the first component is from approximately 10% to approximately 65% by weight, a content ratio of the second component is from approximately 25% to approximately 60% by weight, and a content ratio of the third component is from approximately 5% to approximately 35% by weight, based on the total weight of the liquid crystal compounds.

18. A liquid crystal composition having a negative dielectric anisotropy and consisting essentially of a first component comprising at least one compound selected from a group of compounds represented by formulas (1-1-1), (1-1-2), (1-2-1), (1-2-2), (1-2-3) and (1-3-1), a second component comprising at least one compound selected from the group of compounds represented by formulas (2-1-1), (2-2-1) and (2-3-1), and a third component comprising at least one compound selected from the group of compounds represented by formulas (3-1) to (3-3):

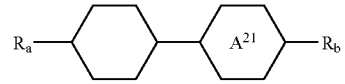 (1-1-1)

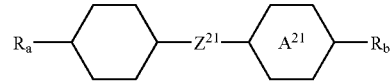 (1-1-2)

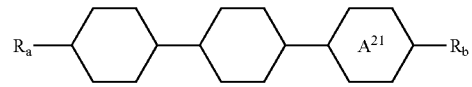 (1-2-1)

 (1-2-2)

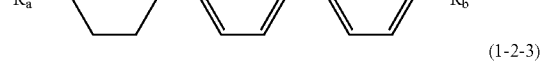 (1-2-3)

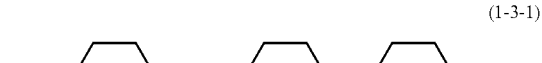 (1-3-1)

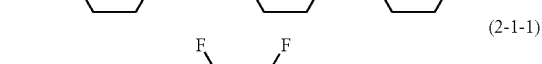 (2-1-1)

 (2-2-1)

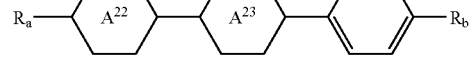

-continued

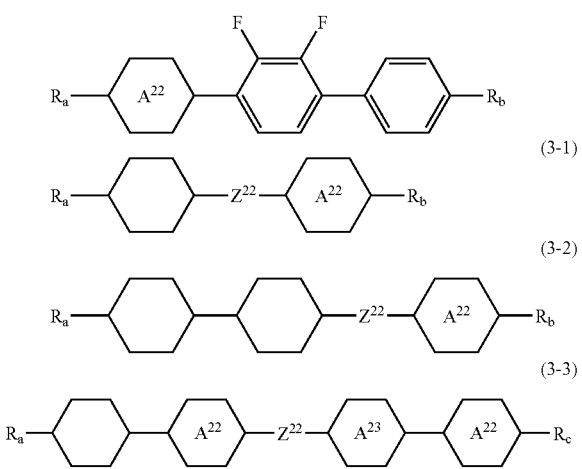

(2-3-1)

(3-1)

(3-2)

(3-3)

wherein in formulas (1-1-1), (1-1-2), (1-2-1), (1-2-2), (1-2-3), (1-3-1), (2-1-1), (2-2-1), (2-3-1) and (3-1) to (3-3), $R_a$ is independently alkyl or alkenyl; $R_b$ is independently alkyl, alkenyl or alkoxy; $R_c$ is alkyl, alkenyl, alkoxy or alkoxymethyl;

ring $A^{21}$ is independently 2-fluoro-1,4-phenylene or 3-fluoro-1,4-phenylene; ring $A^{22}$ is independently 1,4-cyclohexylene or 1,4-phenylene; ring $A^{23}$ is 1,4-cyclohexylene or 1,4-phenylene, arbitrary hydrogen of which may be replaced by fluorine; and $Z^{21}$ is independently —CH$_2$O— or —OCH$_2$—; $Z^{22}$ is independently a single bond, —CH$_2$O—, —OCH$_2$— or —COO.

19. The liquid crystal composition according to claim 2, wherein the liquid crystal composition consisting essentially of a first component comprising at least one compound selected from the group of compounds represented by formulas (1-1-1), (1-1-2), (1-2-1), (1-2-2), (1-2-3) and (1-3-1) and a second component comprising at least one compound selected from a group of compounds represented by formulas (2-1-1), (2-2-1) and (2-3-1).

20. The liquid crystal composition according to claim 1, wherein the liquid crystal composition has a dielectric anisotropy in a range of from approximately −6.5 to approximately −2.0.

21. The liquid crystal composition according to claim 1, wherein the liquid crystal composition has an optical anisotropy in a range of approximately 0.080 to approximately 0.120.

22. A liquid crystal display device comprising the liquid crystal composition according to claim 1.

23. The liquid crystal display device according to claim 1, wherein the liquid crystal display device is driven in an active matrix mode and is displayed in a VA mode or an IPS mode.

* * * * *